(12) United States Patent
Shinagawa et al.

(10) Patent No.: US 6,347,152 B1
(45) Date of Patent: Feb. 12, 2002

(54) MULTIRESOLUTIONAL CRITICAL POINT FILTER AND IMAGE MATCHING USING THE INVENTION

(75) Inventors: Yoshihisa Shinagawa; Tosiyasu Laurence Kunii, both of Tokyo (JP)

(73) Assignee: Monolith Co., Ltd., Tokyo (JP)

( * ) Notice: Subject to any disclaimer, the term of this patent is extended or adjusted under 35 U.S.C. 154(b) by 0 days.

(21) Appl. No.: 09/693,981

(22) Filed: Oct. 23, 2000

Related U.S. Application Data

(60) Continuation of application No. 09/433,368, filed on Nov. 3, 1999, now Pat. No. 6,137,910, which is a division of application No. 08/848,099, filed on Apr. 28, 1997, now Pat. No. 6,018,592.

(30) Foreign Application Priority Data

Mar. 27, 1997 (JP) .............................................. 9-095318

(51) Int. Cl.[7] .............................. G06K 9/46; G06K 9/56; G06K 9/62; G06T 3/40; G06T 7/00
(52) U.S. Cl. ...................... 382/195; 382/205; 382/260; 382/209; 382/118; 382/299
(58) Field of Search .................................. 382/195, 205, 382/199, 209, 217, 218, 190, 201, 260, 299, 154, 118, 206

(56) References Cited

U.S. PATENT DOCUMENTS

| | | | | | |
|---|---|---|---|---|---|
| 5,347,594 A | * | 9/1994 | Grimaud | ...................... | 382/207 |
| 5,842,194 A | * | 11/1998 | Arbuckle | ...................... | 382/224 |
| 6,055,323 A | * | 4/2000 | Okumura | ...................... | 382/118 |

FOREIGN PATENT DOCUMENTS

JP              9-097334      *  4/1997   ............. G06T/7/00

OTHER PUBLICATIONS

Michael Kass, et al., Snakes: Active Contour Models, International Journal of Computer Vision, 321–331 (1998).*
J. Andrew Bangham, et al., Scale–Space from Nonlinear Filters, IEEE Transactions on Pattern Analysis and Machine Intelligence, vol. 18, No. 5, May 1996.*

* cited by examiner

Primary Examiner—Scott Rogers
(74) Attorney, Agent, or Firm—Fleshner & Kim, LLP

(57) ABSTRACT

A multiresolutional filter called a critical point filter is introduced. This filter extracts a maximum, a minimum, and two types of saddle points of pixel intensity for every 2×2 (horizontal×vertical) pixels so that an image of a lower level of resolution is newly generated for every type of a critical point. Using this multiresolutional filter, a source image and a destination image are hierarchized, and source hierarchical images and destination hierarchical images are matched using image characteristics recognized through a filtering operation.

17 Claims, 19 Drawing Sheets

Fig. 9

MULTIRESOLUTIONAL CRITICAL POINT FILTER AND IMAGE MATCHING USING THE INVENTION

This application is a Continuation of application Ser. No. 09/433,368 (U.S. Pat. No. 6,137,910) filed Nov. 3, 1999, which is a Divisional of Ser. No. 08/848,099 (U.S. Pat. No. 6,018,592) filed Apr. 28, 1997.

BACKGROUND OF THE INVENTION

1. Field of the Invention

This invention relates to a multiresolutional filter which generates hierarchical images. In particular, this invention relates to a method for generating an image having a lower resolution using a multiresolutional filter, and an image matching method capable of using this filtering method.

2. Description of the Related Art

Automatic matching of two images, that is, correspondence between image regions or pixels, has been one of the most important and difficult themes of computer vision and computer graphics. For instance, once the images of an object from different view angles are matched, they can be used as the base for generating other views. When the matching of right-eye and left-eye images is computed, the result can immediately be used for stereo photogrammetry. When a model facial image is matched with another facial image, it can be used to extract characteristic facial parts such as the eyes, the nose, and the mouth. When two images of, for example, a man and a cat are matched exactly, all the in-between images can be generated and hence morphing can be done fully automatically.

However, in the existing methods, the correspondence of the points of the two images must generally be specified manually, which is a tedious process. In order to solve this problem, various methods for automatically detecting correspondence of points have been proposed. For instance, application of an epipolar line has been suggested to reduce the number of candidate pairs of points, but the complexity is high. To reduce the complexity, the coordinate values of a point in the left-eye image are usually assumed to be close to those of the corresponding point in the right-eye image. Providing such restriction, however, makes it very difficult to simultaneously match global and local characteristics.

In volume rendering, a series of cross-sectional images are used for constituting voxels. In such a case, conventionally, it is assumed that a pixel in the upper cross-sectional image correspond to the pixel that occupies the same position in the lower cross section, and this pair of pixels is used for the interpolation. Using this very simple method, volume rendering tends to suffer from unclear reconstruction of objects when the distance between consecutive cross sections is long and the shape of the cross sections of the objects thus changes widely.

A great number of image matching algorithms such as the stereo photogrammetry methods use edge detection. In such a method, however, the resulting matched pairs of points are sparse. To fill the gaps between the matched points, the disparity values are interpolated. In general, all edge detectors suffer from the problem of judging whether a change in the pixel intensity in a local window they use really suggests the existence of an edge. These edge detectors suffer from noises because all edge detectors are high pass filters by nature and hence detect noises at the same time.

Optical flow is another known method. Given two images, optical flow detects the motion of objects (rigid bodies) in the images. It assumes that the intensity of each pixel of the objects does not change and computes the motion vector (u,v) of each pixel together with some additional conditions such as the smoothness of the vector field of (u,v). Optical flow, however, cannot detect the global correspondence between images because it concerns only the local change of pixel intensity and systematic errors are conspicuous when the displacements are large.

To recognize the global structures, a great number of multiresolutional filters have been proposed. They are classified into two groups: linear filters and nonlinear filters. An example of the former is a wavelet. However, the linear filters are not useful when used for image matching, because the information of the pixel intensity of extrema as well as their locations are blurred. FIGS. 1($a$) and 1($b$) show the result of the application of an averaging filter to the facial images in FIGS. 19($a$) and 19($b$), respectively. FIGS. 1($k$)–1($l$) show the results of the application of the scaling function of the Battle-Lemarie wavelet to the same facial images. As shown in these drawings, the pixel intensity of extrema is reduced through averaging while the locations are undesirably shifted due to the influence of averaging. As a result, the information of the locations of the eyes (minima of the intensity) is ambiguous at this coarse level of resolution and hence it is impossible to compute the correct matching at this level of resolution. Therefore, although a coarse level is prepared for the purpose of global matching, the obtained global matching does not correctly match the true characteristics of the images (eyes, i.e., the minima) correctly. Even when the eyes appear clearly at the finer level of resolution, it is too late to take back the errors introduced in the global matching. By smoothing the input images, stereo information in textured regions is also filtered out as pointed out.

On the other hand, 1D sieve operators have become available as nonlinear filters which can be used for morphological operations. 1D sieve operators smooth out the images while preserving scale-space causality by choosing the minimum (or the maximum) inside a window of a certain size. The resulting image is of the same size as the original, but is simpler because small undulations are removed. Although this operator may be classified as "a multiresolutional filter" in a broad sense that it reduces image information, it is not a multiresolutional filter in a normal sense as it does not put images into hierarchy while changing the resolution of the images as wavelets do. This operator thus cannot be utilized for detection of correspondence between images.

SUMMARY OF THE INVENTION

In view of the above, the following problems are presented.

1. Image processing methods have rarely been available for accurately identifying the characteristics of an image through relatively simple processing. In particular, effective proposals have been scarcely made in connection with a method for extracting characteristics of an image while preserving information, such as the pixel value or location of a characteristic point.

2. Automatic detection of a corresponding point based on the characteristics of an image generally has had problems including complex processing and low noise durability. In addition, various restrictions have been necessarily imposed in processing, and it has been difficult to obtain a matching which satisfies global and local characteristics at the same time.

3. Although a multiresolutional filter is introduced for recognition of the global structure or characteristics of an image, in the case of a linear filter, information regarding the intensity and location of a pixel becomes blurred. As a result, corresponding points can hardly be recognized with sufficient accuracy. In addition, the 1D sieve operator, which is a non-linear filter, does not hierarchize an image, and cannot be used for detection of a corresponding point between images.

4. With the above problems, extensive manual labor has been inevitably required in processing in order to accurately obtain corresponding points.

The present invention has been conceived to overcome the above problems, and aims to provide techniques for allowing accurate recognition of image characteristics in the image processing field.

In one aspect of the present invention, a new multiresolutional image filter is proposed. This filter is called a critical point filter as it extracts a critical point from an image. A critical point stands for a point having a certain characteristic in an image, including a maximum, where a pixel value (that is, an arbitrary value for an image or a pixel, such as a color number or the intensity) becomes maximum in a certain region, a minimum, where it becomes minimum, and a saddle point, where it becomes maximum for one direction and minimum for another. A critical point may be based on a topological concept, but it may possess any other characteristics. Selection of criteria for a critical point is not an essential matter in this invention.

In the above aspect, image processing using a multiresolutional filter is carried out. In a detection step, a two dimensional search is performed on a first image to detect a critical point. In a following generation step, the detected critical point is extracted for generation of a second image having a lower resolution than that of the first image. The second image inherits critical points from the first image. The second image, having a lower resolution than the first image, is preferably used for recognition of global characteristics of an image.

Another aspect of the invention relates to an image matching method using a critical point filter. In this aspect, source and destination images are matched. The terms a source image" and "a destination image" are determined only for a discriminating purpose, and there is no essential difference between them.

In a first step of this aspect, a critical point filter is applied to a source image to generate a series of source hierarchical images each having a different resolution. In a second step, a critical point filter is applied to a destination image to generate a series of destination hierarchical images. Source and destination hierarchical images stand for a group of images which are obtained by hierarchizing source and destination images, respectively, and each consist of two or more images. In a third step, matching between source and destination hierarchical images is computed. In this aspect, image characteristics concerning a critical point are extracted and/or clarified using a multiresolutional filter. This facilitates matching. According to this aspect, matching may be totally unconstrained.

Still another aspect of the present invention relates to matching source and destination images. In this aspect, an evaluation equation is set beforehand for each of a plurality of matching evaluation items; these equations are combined into a combined evaluation equation; and an optimal matching is detected while paying attention to the neighborhood of an extreme of the combined evaluation equation. A combined evaluation equation may be defined as a linear combination or a sum of these evaluation equations, at least one of which has been multiplied by a coefficient parameter. In such a case, the parameter may be determined by detecting the neighborhood of an extreme of the combined evaluation equation or any of the evaluation equation. The above description used the term "the neighborhood of an extreme," because some error is tolerable as it does not seriously affect the present invention.

Since an extreme itself depends on the parameter, it becomes possible to determine an optical parameter based on the behavior of an extreme. Automatic determination of a parameter, which originally accompanies difficulties in tuning, is achieved.

BRIEF DESCRIPTION OF THE DRAWINGS

The above and the other objects, features, and advantages, will become further apparent from the following description of the preferred embodiment taken in conjunction with the accompanying drawings wherein:

FIG. 9 is a diagram showing correspondence between partial images of the m-th and (m−1)th levels of resolution;

DESCRIPTION OF THE PREFERRED EMBODIMENTS

Figure 1A:
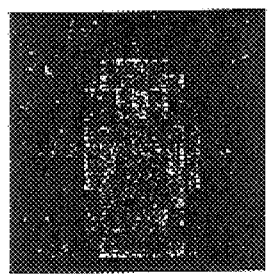
FIG. 1(a) shows an image obtained as the result of the application of an averaging filter to one human facial image.

Elemental techniques applied in a preferred embodiment will be first described in [1]. A concrete description of a processing procedure will then be given in [2], and experimental results will be reported in [3].

[1] Detailed Description of Elementary Techniques

[1.1] Introduction

Using a set of new multiresolutional filters called critical point filters, image matching is accurately computed. There is no need of any prior knowledge of the objects. The matching of the images is computed at each resolution while going down the resolution hierarchy generally from the coarse level to the fine level. Parameters necessary for the computation are set completely automatically by dynamical computation analogous to human visual systems. There is no need of manually specifying correspondence of points between images.

This embodiment can be applied to, for instance, completely automated morphing, object recognition, stereo photogrammetry, volume rendering, smooth generation of motion images from a small number of frames. When applied to morphing, given images can be automatically transformed. When applied to volume rendering, intermediate images between cross sections can be accurately reconstructed, even when the distance between them is long and the cross sections vary widely in shape.

[1.2] The Hierarchy of the Critical Point Filters

Multiresolutional filters according to this embodiment preserve the intensity and the locations of each critical point of the images while reducing the resolution at the same time. Let the width of the image be N and the height be M. For simplicity, $N=M=2^n$ is assumed wherein n is a positive integer. An interval $[0,N]\subset R$ is denoted by I. A pixel of the image at the location (i,j) is denoted by $p^{(i,j)}$ wherein $i,j\in I$.

A multiresolution hierarchy is introduced. Hierarchized image groups are constructed using a multiresolutional filter. The multiresolutional filter carries out a two dimensional search on an original image and detects critical points. It then extracts the critical points to construct another image having a lower resolution. The size of each of the respective images of the m-th level can be denoted as $2^m \times 2^m$ ($0 \leq m \leq n$). The critical point filter constructs the following four new hierarchical images recursively.

$$p_{(i,j)}^{(m,0)}=\min(\min(p_{(2i,2j)}^{(m+1,0)}, p_{(2i,2j+1)}^{(m+1,0)}), \min(p_{(2i+1,2j)}^{(m+1,0)}, p_{(2i+1,2j+1)}^{(m+1,0)}))$$

$$p_{(i,j)}^{(m,1)}=\max(\min(p_{(2i,2j)}^{(m+1,1)}, p_{(2i,2j+1)}^{(m+1,1)}), \min(p_{(2i+1,2j)}^{(m+1,1)}, p_{(2i+1,2j+1)}^{(m+1,1)}))$$

$$p_{(i,j)}^{(m,2)}=\min(\max(p_{(2i,2j)}^{(m+1,2)}, p_{(2i,2j+1)}^{(m+1,2)}), \max(p_{(2i+1,2j)}^{(m+1,2)}, p_{(2i+1,2j+1)}^{(m+1,2)}))$$

$$p_{(i,j)}^{(m,3)}=\max(\max(p_{(2i,2j)}^{(m+1,3)}, p_{(2i,2j+1)}^{(m+1,3)}), \max(p_{(2i+1,2j)}^{(m+1,3)}, p_{(2i+1,2j+1)}^{(m+1,3)})) \quad (1)$$

wherein $$p_{(i,j)}^{(n,0)}=p_{(i,j)}^{(n,1)}=p_{(i,j)}^{(n,2)}=p_{(i,j)}^{(n,3)}=p_{(i,j)}. \quad (2)$$

These four images are hereinafter referred to as subimages. When $\min_{x\leq t\leq x+1}$, $\max_{x\leq t\leq x+1}$ are abbreviated to $\alpha$ and $\beta$, the subimages can be abbreviated to the followings.

$P^{(m,0)}=\alpha(x)\alpha(y)p^{(m+1,0)}$ $P^{(m,1)}=\alpha(x)\beta(y)p^{(m+1,1)}$ $P^{(m,2)}=\alpha(x)\alpha(y)p^{(m+1,2)}$ $P^{(m,3)}=\alpha(x)\beta(y)p^{(m+1,3)}$ That is, they are analogous to the tensor products of $\alpha$ and $\beta$. Subimages correspond to different kinds of critical points, respectively. As is apparent from the above equations, a critical point filter detects a critical point of the original image for every block constituting 2×2 pixels. In this detection, a point having a maximum pixel value and a point having a minimum pixel value are searched with respect to two directions, i.e., vertical and horizontal directions, in each block. Although pixel intensity is employed as a pixel value in this embodiment, various other values relative to an image may be employed. A pixel having maximum pixel values for the two directions, one having minimum pixel values for the two directions, one having a minimum pixel value for one direction and a maximum pixel value for the other direction are detected as a maximum, a minimum, and a saddle point, respectively.

A critical point filter makes a one pixel image of a critical point detected inside each of the respective blocks represent the image (four pixels here) of the block, to thereby reduce resolution of the image. From the singularity theoretical point of view, $\alpha(x)\alpha(y)$ preserves the minima, $\beta(x)\beta(y)$ preserves the maxima, $\alpha(x)\beta(y)$ and $\beta(x)\alpha(y)$ preserve the saddle points.

In operation, at the beginning, critical point filtering is applied separately to a source image and a destination image so as to generate a series of image groups, i.e., source hierarchical images and destination hierarchical images. Four source hierarchical images and four destination hierarchical images are generated corresponding to four critical point types. Then, source hierarchical images and destination hierarchical images are matched. The minima are first matched using $p^{(m,0)}$, the saddle points are then matched using $p^{(m,1)}$ based on the previous matching result for the minima, other saddle points are matched using $p^{(m,2)}$, and finally the maxima are matched using $p^{(m,3)}$.

Figure 1B:
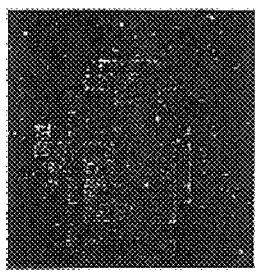
FIG. 1(b) shows an image obtained as the result of the application of an averaging filter to another human facial image.
Figure 1C:
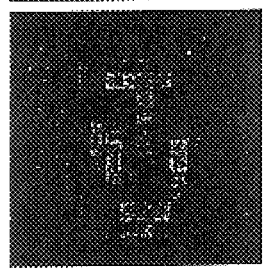
FIG. 1(c) shows an image of one human face at $p^{(5,0)}$ obtained in a preferred embodiment.
Figure 1D:
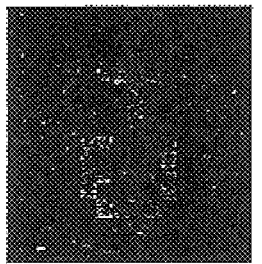
FIG. 1(d) shows an image of another human face at $p^{(5,0)}$ obtained in a preferred embodiment.
Figure 1E:
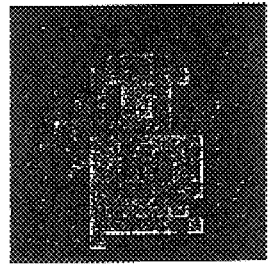
FIG. 1(e) shows an image of one human face at $p^{(5,1)}$ obtained in a preferred embodiment.
Figure 1F:
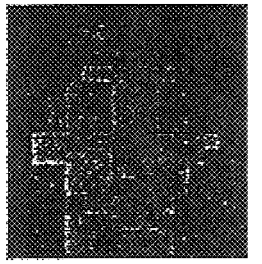
FIG. 1(f) shows an image of one human face at $p^{(5,1)}$ obtained in a preferred embodiment.
Figure 1G:
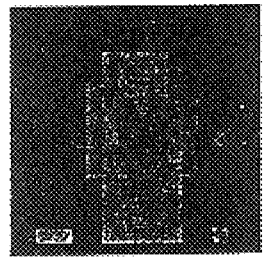
FIG. 1(g) shows an image of one human face at $p^{(5,2)}$ obtained in a preferred embodiment.
Figure 1H:
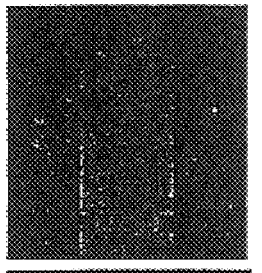
FIG. 1(h) shows an image of one human face at $p^{(5,2)}$ obtained in a preferred embodiment.
Figure 1I:
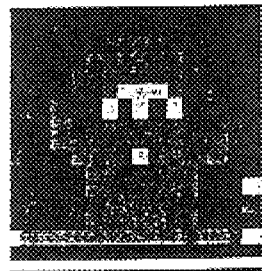
FIG. 1(i) shows an image of one human face at $p^{(5,3)}$ obtained in a preferred embodiment.
Figure 1J:
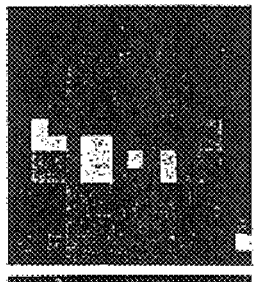
FIG. 1(j) shows an image of one human face at $p^{(5,3)}$ obtained in a preferred embodiment.
Figure 1K:
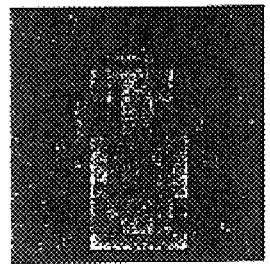
FIG. 1(k) shows an image obtained as the result of the application of the scaling function of the Battle-Lemarie wavelet to one human facial image.
Figure 1L:
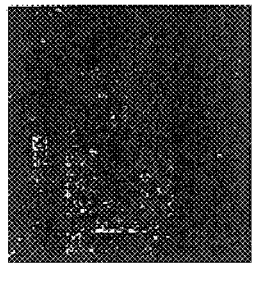
FIG. 1(l) shows an image obtained as the result of the application of the scaling function of the Battle-Lemarie wavelet to another facial image.

FIGS. 1(c) and 1(d) show the subimages $p^{(5,0)}$ of the images in FIGS. 1(a) and 1(b), respectively. Similarly, FIGS. 1(e) and 1(f) show the subimages $p^{(5,1)}$; FIGS. 1(g) and 1(h) show the subimages $p^{(5,2)}$; and FIGS. 1(i) and 1(j) show the subimages $p^{(5,3)}$. Characteristics in images can be easily matched using subimages. The eyes can be matched by $p^{(5,0)}$ because the eyes are minima of pixel intensity in a face. The mouths can be matched by $p^{(5,1)}$ because the months have low intensity in the horizontal direction. Vertical lines on the both sides of the necks become clear by $p^{(5,2)}$. The ears and bright parts of cheeks become clear by $p^{(5,3)}$ because these are maxima of pixel intensity.

As described above, characteristics of an image can be extracted or distinguished a critical point filter. Comparison between characteristics of an image shot by a camera and of several objects stored beforehand enables to recognize an object shot by a camera.

[1. 3] Computation of Mapping Between Images

The pixel of the source image at the location (i,j) is denoted by $p^{(n)}(i,j)$ and that of the destination image at (k,l) is denoted by $q^{(n)}(i,j)$ where i, j, k, l∈I. The energy of the mapping between the images (described later) is then defined. This energy is determined by the difference in the intensity of the pixel of the source image and its corresponding pixel of the destination image and by the smoothness of the mapping. First, the mapping $f^{(m,0)}:p^{(m,0)} \to q^{(m,0)}$ between $p^{(m,0)}$ and $q^{(m,0)}$ with the minimum energy is computed. Based on $f^{(m,0)}$, the mapping $f^{(m,1)}$ between $p^{(m,1)}$ and $q^{(m,1)}$ with the minimum energy is computed. This process continues until $f^{(m,3)}$ between $p^{(m,3)}$ and $q^{(m,3)}$ is computed. Each $f^{(m,i)}$ (i=0, 1, 2, ... ) is referred to as a submapping. The order of i will be changed as follows in computing $f^{(m,i)}$ for reasons to be described later.

$$f^{(m,i)}:p^{(m,\sigma(i))} \to q^{(m,\sigma(i))} \quad (3)$$

wherein $\sigma(i) \in \{0, 1, 2, 3\}$.

[1.3.1] Bijectivity

When the matching between a source image and a destination image is expressed by means of a mapping, that mapping should satisfy the Bijectivity Conditions (BC) between the two images because respective images should be connected satisfying both surjection and injection as there is no conceptual supremacy existing between these images.

It should be noted, however, that the mappings to be constructed here are the digital version of the bijection. In this embodiment, a pixel is identified with a grip point.

The mapping of the source subimage (a subimage of a source image) to the destination subimage (a subimage of a destination image) is represented by $f^{(m,s)}: I/2^{n-m} \times I/2^{n-m} \to I/2^{n-m} \times I/2^{n-m}$ (s=0, 1, ... ), wherein $f^{(m,s)}(i,j)=(k,l)$ means that $p^{(m,s)}_{(i,j)}$ of the source image is mapped to $q^{(m,s)}_{(k,l)}$ of the destination image. For simplicity, a pixel $q_{(k,l)}$ where f(i,j)=(k,l) holds is denoted by $q_{f(i,j)}$.

The definition of Bijectivity is not trivial when the data sets are discrete as image pixels (grip points) in this embodiment. The bijection in this case will be defined as follows, wherein i, i, j, j, k, and l are integers. First, each square $$p_{(i,j)}^{(m,s)} p_{(i+1,j)}^{(m,s)} p_{(i+1,j+1)}^{(m,s)} p_{(i,j+1)}^{(m,s)} \quad (4)$$

on the source image plane denoted by R is considered, wherein i=0, ... $2^m-1$, and j=0, ... , $2^m-1$. The edges of R are directed as the following.

$$\overrightarrow{p_{(i,j)}^{(m,s)} p_{(i+1,j)}^{(m,s)}}, \overrightarrow{p_{(i+1,j)}^{(m,s)} p_{(i+1,j+1)}^{(m,s)}}, \overrightarrow{p_{(i+1,j+1)}^{(m,s)} p_{(i,j+1)}^{(m,s)}} \text{ and } \overrightarrow{p_{(i,j+1)}^{(m,s)} p_{(i,j)}^{(m,s)}} \quad (5)$$

It is necessary that the square be mapped by f to a quadrilateral on the destination image plane. The quadrilateral $$q_{f(i,j)}^{(m,s)} q_{f(i+1,j)}^{(m,s)} q_{f(i+1,j+1)}^{(m,s)} q_{f(i,j+1)}^{(m,s)} \quad (6)$$

denoted by $f^{(m,s)}(R)$ should satisfy the following Bijectivity conditions.

1. The edges of the quadrilateral $f^{(m,s)}$ should not intersect one another.
2. The orientation of the edges of $f^{(m,s)}(R)$ should be the same as that of R (clockwise for FIG. 2).
3. For relaxation, mappings that are retractions are allowed.

Figure 2R:
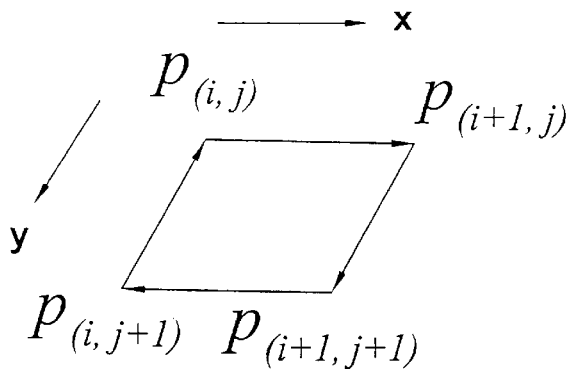
FIG. 2(R) shows an original quadrilateral.
Figure 2A:
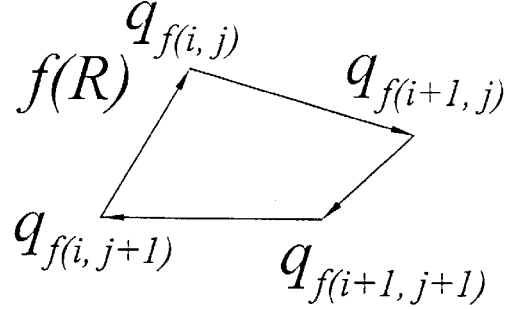
FIG. 2(A) shows an inherited quadrilateral.
Figure 2B:
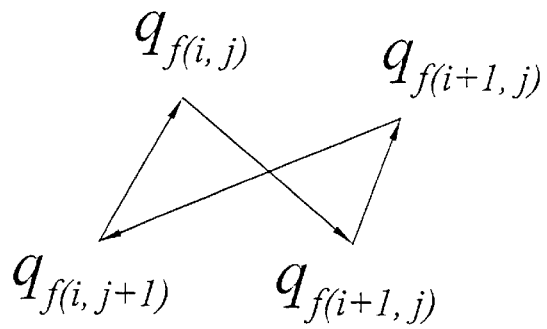
FIG. 2(B) shows an inherited quadrilateral.
Figure 2E:
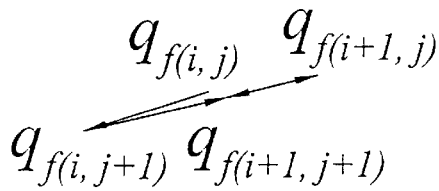
FIG. 2(E) shows an inherited quadrilateral.
Figure 2D:
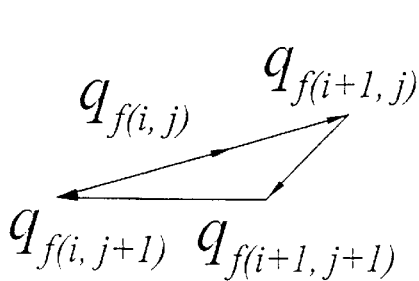
FIG. 2(D) shows an inherited quadrilateral.
Figure 2C:
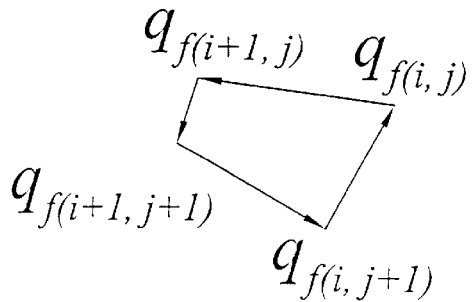
FIG. 2(C) shows an inherited quadrilateral.

Without relaxation, there would be no mappings which completely satisfy the BC other than an identity mapping. In this embodiment, the length of one edge of $f^{(m,s)}(R)$ may be zero. That is, $f^{(m,s)}(R)$ may be a triangle here. However, it must not be a point or a line segment having no area in this embodiment. If FIG. 2(R) is the original quadrilateral, FIGS. 2(A) and 2(D) satisfy BC, but FIGS. 2(B), 2(C), and 2(E) do not.

In implementation, the following condition may be imposed to ease insuring that the mapping is surjection; each pixel on the boundary of the source image is mapped to the pixel that occupies the same location at the destination image, i.e., f(i,j)=(i,j) (on the four lines of i=0, i=$2^m$-1, j=0, j=$2^m$-1). This condition is hereinafter abbreviated to an additional condition.

[1.3.2] The Energy of Mapping

[1.3.2.1] Cost Related to the Pixel Intensity

The energy of the mapping f is defined. A mapping whose energy is minimum will be searched. The energy is determined mainly by the difference in the intensity of the pixel of the source image and its corresponding pixel of the destination image. That is, the energy $C^{(m,s)}_{(i,j)}$ of the mapping $f^{(m,s)}$ at (i,j) is determined as $$C_{(i,j)}^{(m,s)} = |V(p_{(i,j)}^{(m,s)}) - V(q_{f(i,j)}^{(m,s)})|^2 \quad (7)$$

wherein $V(p^{(m,s)}_{(i,j)})$ and $V(q^{(m,s)}f_{(i,j)})$ are the intensity values of the pixels $p^{(m,s)}_{(i,j)}$ and $q^{(m,s)}f_{(i,j)}$, respectively. The total energy $C^{(m,s)}$ of f is a matching evaluation equation, and can be defined as the sum of $C^{(m,s)}_{(i,j)}$; i.e., $$C_f^{(m,s)} = \sum_{i=0}^{i=2^m-1} \sum_{j=0}^{j=2^m-1} C_{(i,j)}^{(m,s)}. \quad (8)$$

[1.3.2.2.] Cost Related to the Locations of the Pixel for Smooth Mapping

To obtain smooth mappings, another energy $D_f$ of the mappings is introduced. This energy is determined by the locations of $p^{(m,s)}{}_{(i,j)}$ and $q^{(m,s)} f_{(i,j)}$ ($i=0, \ldots, 2^m-1, j=0, \ldots, 2^m-1$), regardless of the intensity of the pixels. The energy $D^{(m,s)}{}_{(i,j)}$ of the mapping $f^{(m,s)}$ at $(i,j)$ is determined as $$D_{(i,j)}^{(m,s)} = \eta E_{0(i,j)}^{(m,s)} + E_{1(i,j)}^{(m,s)} \quad (9)$$

wherein coefficient parameter $\eta$ 0 is a real number, and $$E_{0(i,j)}^{(m,s)} = \|(i,j) - f^{(m,s)}(i,j)\|^2; \quad (10)$$

$$E_{1(i,j)}^{(m,s)} = \sum_{i'=i-1}^{i} \sum_{j'=j-1}^{j} \|(f^{(m,s)}(i,j) - (i,j)) - (f^{(m,s)}(i',j') - (i',j'))\|^2 / 4 \quad (11)$$

wherein $$\|(x,y)\| = \sqrt{x^2 + y^2} \quad (12)$$

and $f(i,j)$ is defined to be zero for $i<0$ and $j<0$. $E_0$ is determined by the distance between $(i,j)$ and $f(i,j)$. $E_0$ prevents a pixel being mapped to a pixel too distant. It will be replaced later by another energy function. $E_1$ ensures the smoothness of the mapping. It represents the distance between the displacement of $p(i,j)$ and the displacements of its neighbors. Based on the above, another equation for evaluating the matching, or the energy $D_f$, is determined by $$D_f^{(m,s)} = \sum_{i=0}^{i=2^m-1} \sum_{j=0}^{j=2^m-1} D_{(i,j)}^{(m,s)}. \quad (13)$$

[1.3.2.3] Total Energy of the Mapping

The total energy of the mapping, i.e., a combined evaluation equation is defined as $\lambda C^{(m,s)}{}_f + D^{(m,s)}{}_f$, wherein $\lambda \geq 0$ is a real number. The goal is to detect an extreme of the combined evaluation equation, that is, to find a mapping that gives the minimum energy denoted by $$\min_f \lambda C_f^{(m,s)} + D_f^{(m,s)}. \quad (14)$$

Note that the mapping is an identity mapping (i.e., $f^{(m,s)}(i,j) = (i,j)$ for all $i=0, \ldots, 2^m-1$ and $j=0, \ldots, 2^m-1$) when $\lambda = 0$ and $\eta = 0$. As described later, the mapping will be gradually modified or transformed from an identity mapping because the case of $\lambda = 0$ and $\eta = 0$ is initially evaluated in this embodiment. If a combined evaluation equation is assumed as $C^{(m,s)}{}_f + \lambda D^{(m,s)}{}_f$, with the position of $\lambda$ being changed, the equation where $\lambda = 0$ and $\eta = 0$ is denoted simply by $C^{(m,s)}{}_f$ and pixels would be randomly corresponded to each other only because their pixel intensities are close. This makes the mapping totally meaningless. Modifying mappings based on such a meaningless mapping makes no sense. Thus, a coefficient parameter is determined such that an identity mapping is initially selected for the evaluation as the best mapping. Similar to this embodiment, optical flow considers the difference in the pixel intensity and smoothness. However, it cannot be used for image transformation because it takes into account only local movement of an object. Using a critical point filter according to this embodiment, global correspondence can be detected.

[1.3.3] Determining the Mapping with Multiresolution

A mapping $f_{min}$ that gives the minimum energy and satisfies BC is searched using the multiresolution hierarchy. The mappings between the source and destination images at each level of the resolution is computed. Starting from the coarsest image of the top of the resolution hierarchy, the mapping is determined at each level, while considering the mapping at other levels. The number of candidate mappings at each level is constrained by using the mappings at an upper, i.e., coarser, level of the hierarchy. To be more specific, a mapping at a certain level is determined using the mapping obtained at the coarser level by one.

When $$(i', j') = \left(\left[\frac{i}{2}\right], \left[\frac{i}{2}\right]\right) \quad (15)$$

holds, $p^{(m-1,s)}{}_{(i',j')}$ and $q^{(m-1,s)}{}_{(i',j')}$ are respectively called the parent of $p^{(m,s)}{}_{(i,j)}$ and $q^{(m,s)}{}_{(i,j)}$. Note that $[x]$ is the largest integer that does not exceed $x$. Conversely, $p^{(m,s)}{}_{(i,j)}$ and $q^{(m,s)}{}_{(i,j)}$ are called the child of $p^{(m-1,s)}{}_{(i,j)}$ and $q^{(m-1,s)}{}_{(i,j)}$, respectively. The function parent $(i,j)$ is defined as $$\text{parent}(i, j) = \left(\left[\frac{i}{2}\right], \left[\frac{j}{2}\right]\right). \quad (16)$$

A mapping $f^{(m,s)}$ between $p^{(m,s)}{}_{(i,j)}$ and $q^{(m,s)}{}_{(k,l)}$ is then determined by computing and finding the minimum energy. The value $f^{(m,s)}(i,j) = (k,l)$ is determined as follows using $f^{(m-1,s)}$ ($m=1, 2, \ldots, n$). Imposing a condition that $q^{(m,s)}{}_{(k,l)}$ should be inside a quadrilateral defined below, the mappings which are thought to be reasonable or natural are selected from among the mappings which satisfy the BC.

$$q_{g^{(m,s)}(i-1,j-1)}{}^{(m,s)} q_{g^{(m,s)}(i-1,j+1)}{}^{(m,s)} q_{g^{(m,s)}(i+1,j+1)}{}^{(m,s)} q_{g^{(m,s)}(i+1,j-1)}{}^{(m,s)} \quad (17)$$

wherein $$g^{(m,s)}(i,j) = f^{(m-1,s)}(\text{parent}(i,j)) + f^{(m-1,s)}(\text{parent}(i,j) + (1,1)) \quad (18)$$

The quadrilateral defined above is hereinafter referred to as the inherited quadrilateral of $p^{(m,s)}{}_{(i,j)}$. Inside the inherited quadrilateral, the pixel that minimizes the energy is searched.

Figure 3:
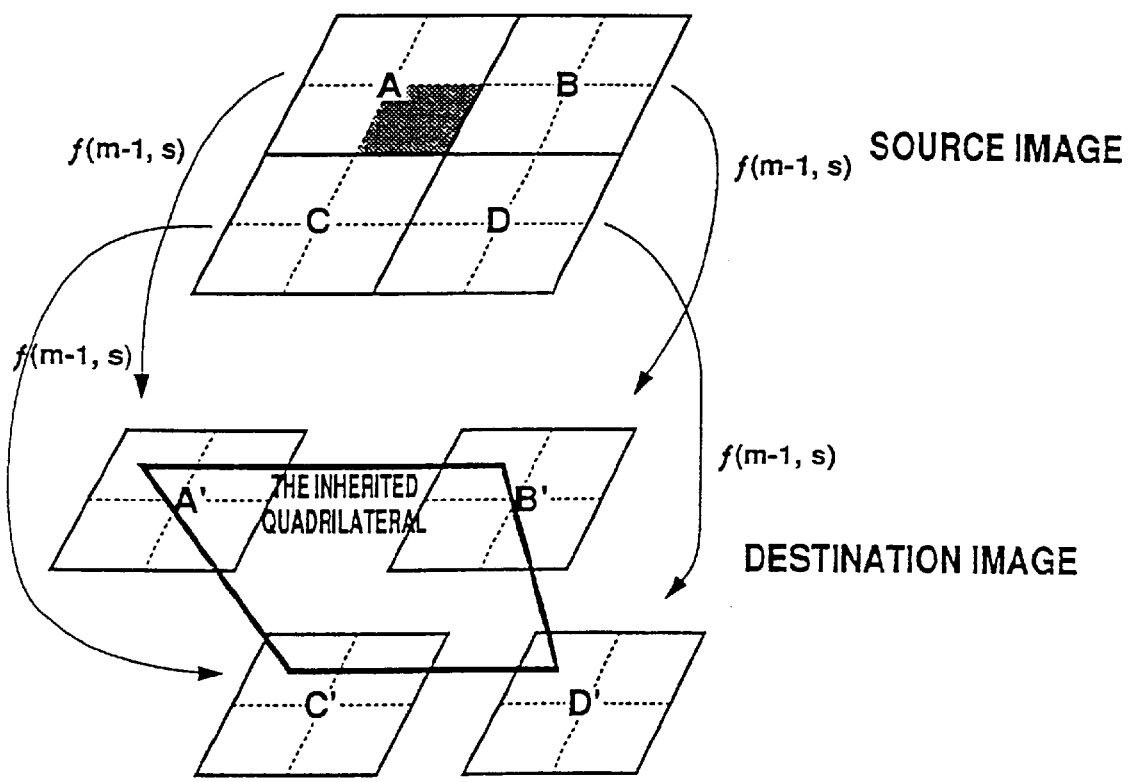
FIG. 3 is a diagram showing the relationship between a source image and a destination image and that between the m-th level and the (m−1)th level, using a quadrilateral.

The above description is illustrated in FIG. 3, wherein the pixels A, B, C, and D of the source image are mapped to A, B, C, and D of the destination image, respectively, at the (m−1)th level in the hierarchy. The pixel $p^{(m,s)}{}_{(i,j)}$ should be mapped to the pixel $q^{(m,s)}{}_{f(m)(i,j)}$ that exists in the interior of the inherited quadrilateral A'B'C'D'. With the above consideration, bridging from the mapping at the (m−1)th level to that at the m-th level is achieved.

The energy $E_0$ defined above is now replaced by $$E_{0(i,j)} = \|f^{(m,0)}(i,j) - g^{(m)}(i,j)\|^2 \quad (19)$$

for computing the submapping $f^{(m,0)}$, and $$E_{0(i,j)} = \|f^{(m,s)}(i,j) - f^{(m,s-1)}(i,j)\|^2 (1 \leq i) \quad (20)$$

for computing the submapping $f^{(m,s)}$ at the m-th level.

In this way, a mapping that maintains a low energy for all the submappings is obtained. Equation 20 makes submappings for different critical points associated to each other in the manner that subimages at the same level have high similarity. Equation 19 represents the distance between $f^{(m,s)}(i,j)$ and the location where (i,j) should be mapped when regarded as a part of a pixel at the (m−1)th level.

Where there is no pixel that satisfies the BC inside the inherited quadrilateral A'B'C'D', the following measures are employed. First, pixels whose distance from the boundary of A'B'C'D' is L (at first, L=1) are examined. Among them, the one with the minimum energy satisfying the BC is chosen as the value of $f^{(m,s)}(i,j)$. L is increased until such a pixel is found or L reaches its upper bound $L^{(m)}max$. $L^{(m)}max$ is fixed for each level m. If no such a pixel is found at all, the third condition of the BC is abandoned temporarily and such mappings that cause the quadrilateral to become a point or a line are permitted for determining $f^{(m,s)}{}_{(i,j)}$. If such a pixel is still not found, the first and the second conditions of the BC are next abandoned.

Multiresolution approximation is essential for determining the global correspondence of the images while avoiding the mapping being affected by small details of the images. Without the multiresolution approximation, it is impossible to detect a correspondence between pixels whose distance is large and hence the size of an image is limited to be very small, and only tiny changes in this images can be handled. Moreover, imposing smoothness on the mapping prevents finding the correspondence of such pixels because the energy of the mapping from a pixel to a pixel at a distance is high. The multiresolution approximation enables finding the appropriate correspondence of such pixels because the distance between them is small at the upper (coarse) level of the hierarchy of the resolution.

[1.4] Automatic Determination of the Optimal Parameter Values

One of the main deficiencies of existing image matching techniques lies in the difficulty of parameter tuning. In most cases, the tuning is done manually and it has been extremely difficult to choose the optimal value. According to this embodiment, the optimal parameter values can be obtained completely automatically.

The system of this embodiment includes two parameters, namely, $\lambda$ and $\eta$. $\lambda$ is the weight of the difference of the pixel intensity and $\eta$ represents the stiffness of the mapping. These parameter values are increased step by step starting from 0. $\lambda$ is first increased while fixing $\eta$ at 0. As $\lambda$ gets larger from 0 and the value of the combined evaluation equation (equation 14) is minimized, the value of $C^{(m,s)}f$ for each submapping generally becomes smaller. This basically means that the two images are matched better. However, if the value $\lambda$ exceeds its optimal value, the following phenomena occur.

1. Pixels which should not be corresponded are erroneously corresponded only because their intensities are close.
2. Correspondence between images becomes inaccurate, and the mapping is spoiled.
3. $D^{(m,s)}f$ in equation 14 is going to increase abruptly.
4. The value of equation 14 is going to increase abruptly, so $f^{(m,s)}$ is so changed that the abrupt increase of $D^{(m,s)}f$ is suppressed. This resultantly causes an increase of $C^{(m,s)}f$.

Therefore, a threshold value at which $C^{(m,s)}f$ is turned to increase is detected while tracing the minimum value of equation 14, and the detected value is determined as the optimal value of $\lambda$ at $\eta=0$. Subsequently, the behavior of $C^{(m,s)}f$ is observed while increasing $\eta$ step by step, and $\eta$ is automatically determined according to a procedure described later. Corresponding to $\eta$ thus determined, $\lambda$ is also determined.

This method is analogous to the focusing mechanism of human visual systems where the images of the left and right eye are matched while moving one eye and the eye is fixed when the objects are clearly recognized.

[1.4.1] Dynamic determination of $\lambda$ $\lambda$ is increased from 0 step by step, and each time $\lambda$ is changed a submapping is evaluated. As is shown by equation 14, the total energy is defined by $\lambda C^{(m,s)}f+D^{(m,s)}f$. $D^{(m,s)}f$ in equation 9 represents the smoothness and theoretically becomes minimum for an identity mapping which is examined first. $E_0$ and $E_1$ increase when the mapping is changed because it becomes more distorted from the identity mapping. As $E_1$ is an integer, 1 is the smallest step of $D^{(m,s)}f$. Thus, it is impossible to reduce the total energy by changing the mapping, unless the new mapping reduces $\lambda C^{(m,s)}{}_{(i,j)}$ by one or more.

In this situation, it is now shown that condition, $C^{(m,s)}{}_{(i,j)}$ decreases in normal cases as $\lambda$ increases. The histogram of $C^{(m,s)}{}_{(i,j)}$ is denoted as h(l), wherein h(l) is the number of pixels whose energy $C^{(m,s)}{}_{(i,j)}$ is $l^2$. In order that $\lambda l^2 \geq 1$ holds, the case of $l^2=1/\lambda$ is now considered. When $\lambda$ is slightly varied from $\lambda_1$ to $\lambda_2$, a number of pixels expressed by $$A = \sum_{l=\lceil \frac{1}{\lambda_2} \rceil}^{\lfloor \frac{1}{\lambda_1} \rfloor} h(l) \simeq \int_{l=\frac{1}{\lambda_2}}^{\frac{1}{\lambda_1}} h(l)\,dl \qquad (21)$$

$$= -\int_{\lambda_2}^{\lambda_1} h(l) \frac{1}{\lambda^{3/2}}\,d\lambda$$

$$= \int_{\lambda_1}^{\lambda_2} \frac{h(l)}{\lambda^{3/2}}\,d\lambda$$

move to a more stable state having the energy of $$C_f^{(m,s)} - l^2 = C_f^{(m,s)} - \frac{1}{\lambda} \qquad (22)$$

Here, all the energy of these pixels are assumed to become zero. This equation represents that the value of $C^{(m,s)}f$ is changed by $$\partial C_f^{(m,s)} = -\frac{A}{\lambda} \qquad (23)$$

Therefore, $$\frac{\partial C_f^{(m,s)}}{\partial \lambda} = -\frac{h(l)}{\lambda^{5/2}} \qquad (24)$$

holds.

As h(l)>0, $C^{(m,s)}f$ decreases in normal cases. When $\lambda$ tries to go beyond the optimal value, however, the above phenomenon, that is, an increase of $C^{(m,s)}f$ occurrs. By detecting this phenomenon, the optimal value of $\lambda$ is determined.

If $$h(l) = Hl^k = \frac{H}{\lambda^{k/2}} \qquad (25)$$

is assumed wherein H>0 and k are constants, $$\frac{\partial C_f^{(m,s)}}{\partial \lambda} = -\frac{H}{\lambda^{5/2+k/2}} \quad (26)$$

holds. If k≠−3, $$C_f^{(m,s)} = C + \frac{H}{(3/2+k/2)\lambda^{3/2+k/2}} \quad (27)$$

holds. This is a generalized equation for $C^{(m,s)}f$, wherein C is a constant.

In detection of the optimal value for $\lambda$, the number of pixels violating the BC may be checked for safety. The probability of violating the BC when determining a mapping for each pixel is assumed as $p_0$. As $$\frac{\partial A}{\partial \lambda} = \frac{h(l)}{\lambda^{3/2}} \quad (28)$$

holds, the number of pixels violating the BC increases at the rate $$B_0 = \frac{h(l)p_0}{\lambda^{3/2}} \quad (29)$$

and hence $$\frac{B_0 \lambda^{3/2}}{p_0 h(l)} = 1 \quad (30)$$

is a constant. If $h(l)=Hl^k$ is assumed, for example $$B_0 \lambda^{3/2+k/2} = p_0 H \quad (31)$$

is a constant. When $\lambda$ goes beyond the optimal value, however, the above value increases abruptly. This phenomenon is detected to determine the optimal value of $\lambda$ by checking whether or not $B_0 \lambda^{3/2+k/2}/2^m$ exceeds an abnormal value $B_{0thres}$. The increasing rate $B_1$ of pixels violating the third condition of the BC is checked in the same way by checking whether or not $B_1 \lambda^{3/2+k/2}/2^m$ exceeds an abnormal value $B_{1thres}$. The reason why the factor $2^m$ is introduced is described later. The system is not sensitive to the two threshold values. They are used to detect abnormally excessive distortion of the mapping in case it is failed to be detected through observation of the energy value $C^{(m,s)}f$.

In the implementation, if $\lambda$ exceeds 0.1 when computing the submapping $f^{(m,s)}$, the computation of $f^{(m,s)}$ is abandoned and the computation of $f^{(m,s+1)}$ is started. This is because computation of submappings is affected by the difference of mere 3 out of 256 levels in the pixel intensity when $\lambda>0.1$, and it is then difficult to get a correct result.

[1.4.2] The Histogram h(l)

Checking of $C^{(m,s)}f$ does not depend on the histogram $h(l)$, while checking of BC and the third condition of BC may depend on $h(l)$. Actually, k is typically around 1 if ($\lambda$, $C^{(m,s)}f$) is plotted. In the implementation, k=1 is used, and $B_0 \lambda^2$ and $B_1 \lambda^2$ are checked. If the true value of k is smaller than 1, $B_0 \lambda^1$ and $B_1 \lambda^2$ are not constants and increase gradually by the factor $\lambda^{(1-k)/2}$. When $h(l)$ is a constant, the factor is, for instance, $\lambda^{1/2}$. Such a difference can be absorbed by setting the threshold $B_{0thres}$ appropriately.

Here, model the source image by a circular object with its center at $(x_0,y_0)$ and radius r given by $$p_{(i,j)} = \begin{cases} \frac{255}{r}c\left(\sqrt{(i-x_0)^2+(j-y_0)^2}\right) & \left(\sqrt{(i-x_0)^2+(j-y_0)^2} \leq r\right) \\ 0 & \text{(otherwise)} \end{cases} \quad (32)$$

and the destination image by $$q_{(i,j)} = \begin{cases} \frac{255}{r}c\left(\sqrt{(i-x_1)^2+(j-y_1)^2}\right) & \left(\sqrt{(i-x_1)^2+(j-y_1)^2} \leq r\right) \\ 0 & \text{(otherwise)} \end{cases} \quad (33)$$

with its center at (x1,y1) and radius r. Let c(x) be in the form of $c(x)=x^k$. The histogram $h(l)$ is then in the form of $$h(l) \propto rl^k (k \neq 0) \quad (34)$$

if the centers (x0,y0) and (x1,y1) are sufficiently far.

When k=1, the images represent objects with clear boundaries embedded in the backgrounds. These objects are darkest at their centers and brightest at their boundaries. When k=−1, the images represent objects with vague boundaries. These objects are brightest at their centers, and darkest at their boundaries. It is generally considered that normal objects are usually in-between of these two types. Therefore, k being $-1 \leq k \leq 1$ can cover the most cases, and it is ensured that equation 27 is a decreasing function for this range.

As is known from equation 34, r is affected by the resolution of the images; i.e., r is proportional to $2^m$. This is the reason why the factor $2^m$ is introduced in [1.4.1].

[1.4.3] Dynamic Determination of η

The other parameter η can also be determined automatically in the same manner. Initially, η=0 is set, and the final mapping $f^{(n)}$ and the energy $C^{(n)}f$ at the finest resolution are computed. Subsequently, after η is increased by a certain value Δη and the final mapping $f^{(n)}$ and the energy $C^{(n)}f$ at the finest resolution are again computed. This process is repeated until the optimal value is obtained. η represents the stiffness of the mapping because it is a weight of $$o_{(i,j)}^{(m,s)} = \|f^{(m,s)}(i,j) - f^{(m,s-1)}(i,j)\|^2 \quad (35)$$

Figure 4:
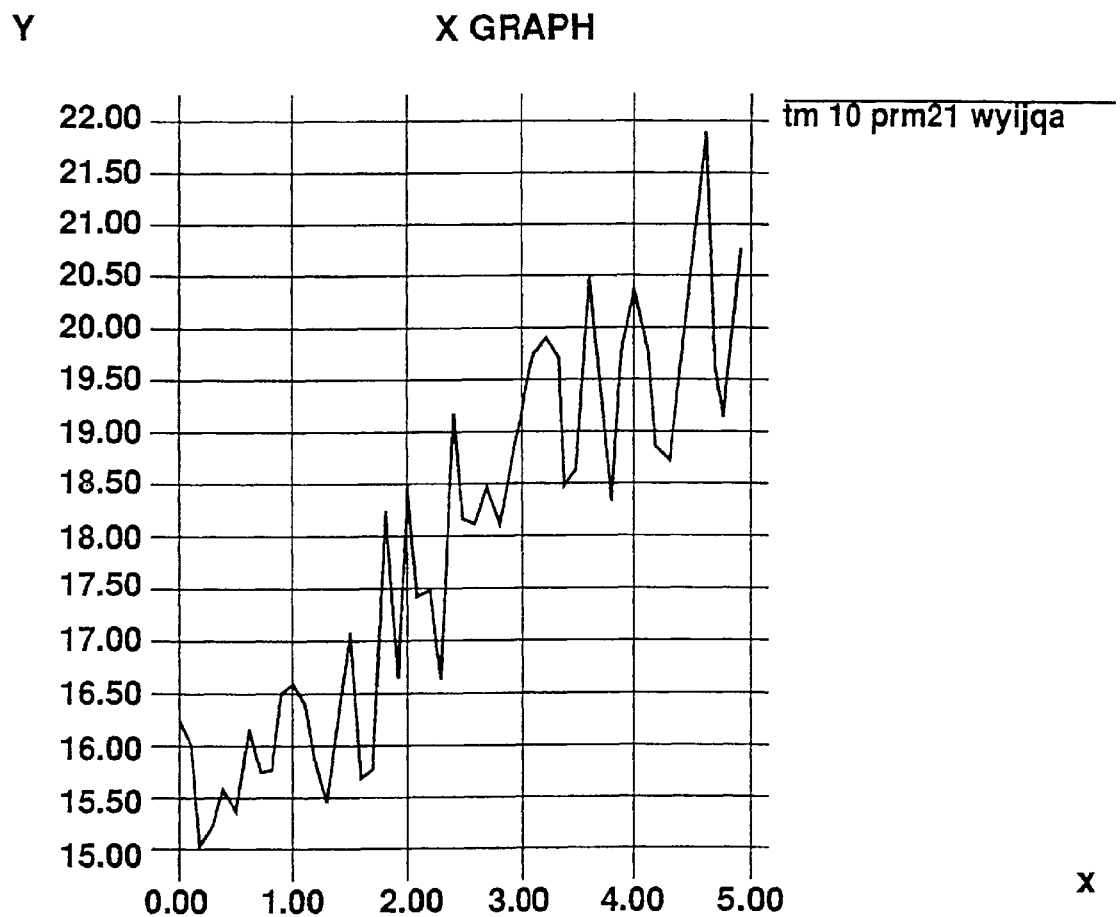
FIG. 4 shows the relationship between a parameter η and energy Cf.

When η is zero, $D^{(n)}f$ is determined irrespective of the previous submapping, and the present submapping would be elastically deformed and become too distorted. When η is very large, $D^{(n)}f$ is almost completely determined by the previous submapping. The submappings are then very stiff, and the pixels are mapped to the same locations. The resulting mapping is therefore an identity mapping. When the value of η increases starting from 0, $C^{(n)}f$ gradually decreases as described later. When it goes beyond the optimal value, however, the energy begins to increase, as shown in FIG. 4. In FIG. 4, x-axis represents η, and y-axis represents Cf.

The optimum value of η with the minimum $C^{(n)}_f$ is obtained in this manner. However, different from the case of η, various elements affect the computation relative to η, as a result of which $C^{(n)}f$ varies while slightly fluctuating. This difference is caused because a submapping is re-computed only once for each step in the case of $\lambda$, whereas all the submappings must be re-computed in the case of η. Whether or not the obtained value of $C^{(n)}f$ is minimum cannot be judged immediately because of the fluctuation. The true minimum has to again be searched for in detail near the obtained candidate minimum value with a smaller interval.

[1.5] Supersampling

The range of $f^{(m,s)}$ can be expanded to R×R to increase the degree of freedom when deciding the correspondence between the pixels. (R stands for the set of real numbers.) In this case, the intensity values of the pixels of the destination image is interpolated to provide $f^{(m,s)}$ with the intensity values at non-integer points $$V(q_{f^{(m,s)}(i,j)}^{(m,s)}) \qquad (36)$$

That is, supersampling is performed. In the implementation, $f^{(m,s)}$ is allowed to take integer and half integer values, and $$V(q_{(i,j)+(0.5,0.5)}^{(m,s)}) \qquad (37)$$

is given by $$(V(q_{(i,j)}^{(m,s)})+V(q_{(i,j)+(1,1)}^{(m,s)}))/2. \qquad (38)$$

[1.6] Normalization of the Pixel Intensity of Each Image

When the source and destination images contain quite different objects, the raw pixel intensity may not be used to compute the mapping because a large difference in the pixel intensity causes excessively large energy $C^{(m,s)}f$ for the pixel intensity, and this makes it difficult to obtain accurate evaluation.

Figure 8:
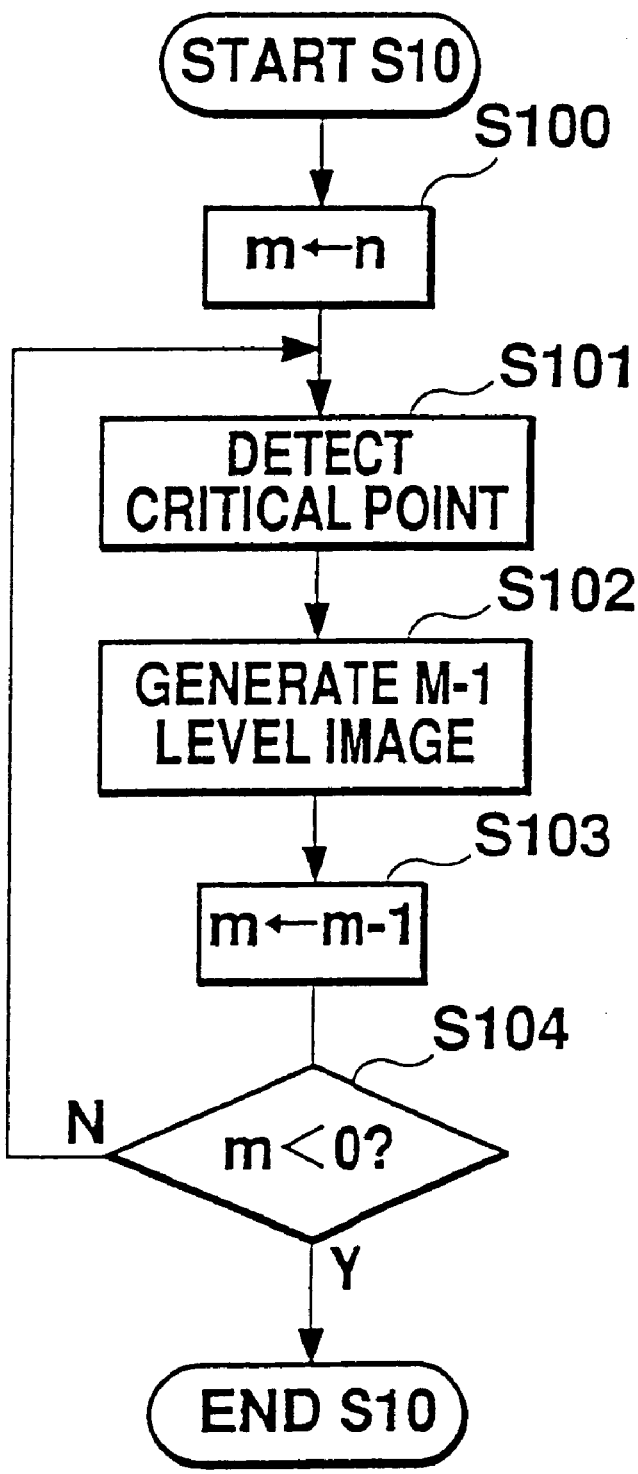
FIG. 8 is a flowchart showing the details of the process at S10 in FIG. 7.

For instance, in a case where a human face and a face of a cat are matched as shown in FIG. 8, the face of the cat is furry and is a mixture of very bright pixels and very dark pixels. In this case, to compute the submappings of the subimages between the two facial images, it is preferred to normalize the subimages; i.e., the darkest pixel intensity should be set to 0, the brightest pixel intensity to 255, and the other pixel intensity values are linearly interpolated.

[1.7] Implementation

In the implementation, a heuristic where the computation proceeds linearly as the souse image is scanned is used. First, the value of $f^{(m,s)}$ is determined at the top leftmost pixel (i,j)=(0,0). The value of each $f^{(m,s)}(i,j)$ is then determined while i is increased by one at each step. When i reaches the width of the image, j is increased by one and i is set to zero. In this way, $f^{(m,s)}(i,j)$ is determined while scanning the source image. Once pixel correspondence is determined for all the points, one mapping $f^{(m,s)}$ is determined.

When a corresponding point $q_{f(i,j)}$ is determined for $p_{(i,j)}$, a corresponding point $q_{f(i,j+1)}$ of $p_{(i,j+1)}$ is next determined. The position of $q_{f(i,j+1)}$ is constrained by the position of $q_{f(i,j)}$ as the former satisfies the BC. Thus, in this system, a point whose corresponding point is determined earlier has higher priority. If the situation in which (0,0) is always given the highest priority continues, the mapping to be finally obtained might be unnecessarily biased. In order to avoid this, $f^{(m,s)}$ is determined as follows in this embodiment.

When (s mod 4) is 0, $f^{(m,s)}$ is determined starting from (0,0) while increasing i and j. When (s mod 4) is 1, it is determined starting from the top rightmost location while decreasing i and increasing j. When (s mod 4) is 2, it is determined starting from the bottom rightmost location while decreasing i and j. When (s mod 4) is 3, it is determined starting from the bottom leftmost location while increasing i and decreasing j. Since no conception of submappings, i.e., parameter t, exists in the finest n-th level, computation is done consecutively in two directions assuming s=0 and s=2.

In the actual implementation, the values of $f^{(m,s)}(i,j)$ that satisfy the BC are chosen from the candidates (k,l) by awarding a penalty to the candidates that violate the BC. The energy $D_{(k,l)}$ of the candidate that violates the third condition is multiplied by $\phi$ and that of a candidate that violates the first or second condition is multiplied by $\Psi$. In the implementation, $\phi=2$ and $\Psi=100000$ are used.

For the above checking of the BC conditions, the following test is performed when determining $(k,l)=f^{(m,s)}(i,j)$. That is, for each grip point (k,l) in the inherited quadrilateral of $f^{(m,s)}(i,j)$, whether or not the z-component of the outer product of $$W=\vec{A}\times\vec{B} \qquad (39)$$

is equal to or greater than 0 is checked, wherein $$\vec{A} = \overrightarrow{q_{f(m,s)(i,j-1)}^{(m,s)} q_{f(m,s)(i+1,j-1)}^{(m,s)}} \qquad (40)$$

$$\vec{B} = \overrightarrow{q_{f(m,s)(i,j-1)}^{(m,s)} q_{(k,l)}^{(m,s)}} \qquad (41)$$

(here, the vectors are regarded as 3D vectors and the z-axis is defined in the orthogonal right hand coordinate system.) When W is negative, the candidate is awarded a penalty by multiplying $D^{(m,s)}_{(k,l)}$ by $\Psi$ to avoid choosing, if possible.

Figure 5A:
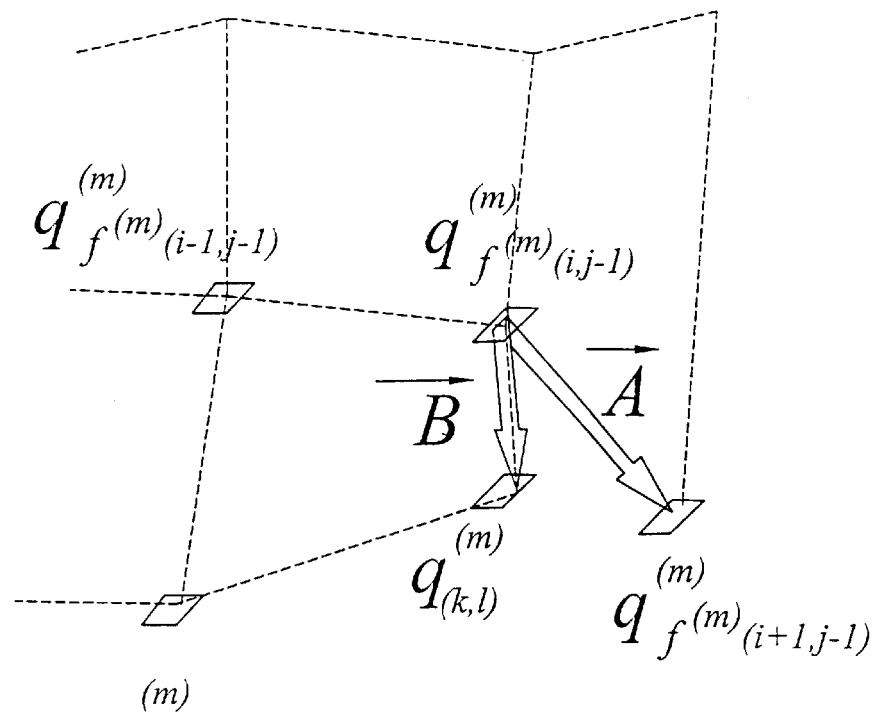
FIG. 5(a) is a diagram illustrating determination of whether or not the mapping for a certain point satisfies Bijectivity conditions through outer product computation.
Figure 5B:
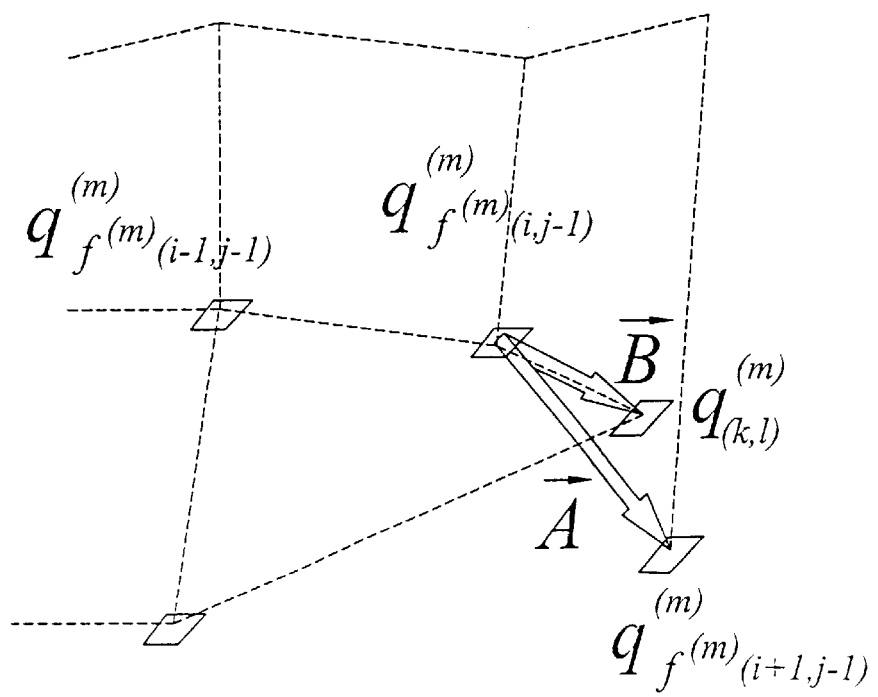
FIG. 5(b) is a diagram illustrating determination of whether or not the mapping for a certain point satisfies Bijectivity conditions through outer product computation.

FIGS. 5(a) and 5(b) show the reason why this condition is considered in detection. FIG. 5(a) represents a candidate without a penalty; FIG. 5(b) represents one with a penalty. When determining the mapping $f^{(m,s)}(i,j+1)$ for the adjacent pixel at (i,j+1), there is no pixel on the source image plane that satisfies the BC if the z-component of W is negative because $q^{(m,s)}_{(k,l)}$ exceeds the boundary of the adjacent quadrilateral.

[1.7.1] The Order of Submappings

In the implementation, $\sigma(0)=0$, $\sigma(1)=1$, $\sigma(2)=2$, $\sigma(3)=3$, $\sigma(4)=0$ have been used at the even levels of resolution, and $\sigma(0)=3$, $\sigma(1)=2$, $\sigma(2)=1$, $\sigma(3)=0$, $\sigma(4)=3$ have been used at the odd levels of resolution. Thus, the submappings are shuffled. Note that submapping are originally of four types, and s may be any of 0 to 3. In the implementation, however, processing for s=4 is performed for the reason to be described later.

[1.8] Interpolations

After the mapping between the source and destination images is determined, the intensity values of the corresponding pixels are interpolated. In the implementation, trilinear interpolation is used. Suppose a square $p_{(i,j)}p_{(i+1,j)}p_{(i,j+1)}p_{(i+1,j+1)}$ on the source image plane is mapped to a quadrilateral $qf_{(i,j)}qf_{(i+1,j)}qf_{(i,j+1)}qf_{(i+1,j+1)}$ on the destination image plane. For simplicity, the distance between the image planes is assumed to be 1. The intermediate image pixels r(x,y,t) ($0 \leq x \leq N-1$, $0 \leq y \leq M-1$) whose distance from the source image plane is t ($0 \leq t \leq 1$) are obtained as follows. First, the location of the pixel r(x,y,t), wherein x,y,t∈R, is determined by the equation $$(x, y) = (1 - dx)(1 - dy)(1 - t)(i, j) + (1 - dx)(1 - dy)tf(i, j) + \qquad (42)$$
$$dx(1 - dy)(1 - t)(i + 1, j) + dx(1 - dy)tf(i + 1, j) +$$
$$(1 - dx)dy(1 - t)(i, j + 1) + (1 - dx)dyt f(i, j + 1) +$$
$$dxdy(1 - t)(i + 1, j + 1) + dxdyt f(i + 1, j + 1).$$

The value of the pixel intensity at r(x,y,t) is then determined by the equation $$V(r(x, y, t)) = (1 - dx)(1 - dy)(1 - t)V(p_{(i,j)}) + \qquad (43)$$
$$(1 - dx)(1 - dy)tV(q_{f(i,j)}) +$$
$$dx(1 - dy)(1 - t)V(p_{(i+1,j)}) +$$

-continued $$dx(1-dy)tV(q_{f(i+1,j)}) +$$
$$(1-dx)dy(1-t)V(p_{(i,j+1)}) +$$
$$(1-dx)dytV(q_{f(i,j+1)}) +$$
$$dxdy(1-t)V(p_{(i+1,j+1)}) + dxdytV(q_{f(i+1,j+1)})$$

wherein dx and dy are parameters varying from 0 to 1.

[1.9] Constraining the Mapping

In the above determination of the mapping, no designation concerning pixel correspondence between the source and the destination images is given from outside. However, when correspondence between particular pixels of the two images is input beforehand, the mappings can be determined using he correspondence as a constraint.

The basic idea is to roughly distort the source image by the approximate mapping that maps the specified pixels of the source image to the specified pixels of the destination images, and then compute the accurate mapping f.

First, the specified pixels of the source image are mapped to the specified pixels of the destination image to determine the approximate mapping that maps other pixels of the source image to appropriate locations. Pixels in the vicinity of the specified pixel are mapped to the locations near the position where the specified one is mapped. The approximate mapping at the m-th level in the resolution hierarchy is denoted as $F^{(m)}$.

The approximate mapping F is determined as follows. First, the mapping for several pixels are specified. When $n_s$ pixels $$p(i_0,j_0), p(i_1,j_1), \ldots p(i_{n_s-1},j_{n_s-1}) \tag{44}$$

of the source image are to be specified, the values $$F^{(n)}(i_0,j_0)=(k_0,l_0),$$
$$F^{(n)}(i_1,j_1)=(k_1,l_1), \ldots,$$
$$F^{(n)}(i_{n_s-1},j_{n_s-1})=(k_{n_s-1},l_{n_s-1}) \tag{45}$$

are determined.

For the remaining pixels of the source image, the amount of displacement is the weighted average of the displacement of $p_{(i_h,j_h)}$ (h=0, ..., $n_s-1$); i.e., a pixel $p_{(i,j)}$ is mapped to the pixel of the destination image at $$F^{(m)}(i,j) = \frac{(i,j) + \sum_{h=0}^{h=n_s-1}(k_h - i_h, l_h - j_h)\, weight_h(i,j)}{2^{n-m}} \tag{46}$$

wherein $$weight_h(i,j) = \frac{1/\|(i_h-i, j_h-j)\|^2}{\text{total weight}(i,j)} \tag{47}$$

$$\text{total weight}(i,j) = \sum_{h=0}^{h=n_s-1} 1/\|(i_h-i, j_h-j)\|^2. \tag{48}$$

Second, the energy $D^{(m,s)}_{(i,j)}$ of the candidate mappings f is changed so that mappings f similar to $F^{(m)}$ have lower energy. To be precise, $$D_{(i,j)}^{(m,s)} = E_{0(i,j)}^{(m,s)} + \eta E_{1(i,j)}^{(m,s)} + \kappa E_{2(i,j)}^{(m,s)} \tag{49}$$

wherein $$E_{2(i,j)}^{(m,s)} = \tag{50}$$
$$\begin{cases} 0, & \text{if } \|F^{(m)}(i,j) - f^{(m,s)}(i,j)\|^2 \leq \left[\dfrac{\rho^2}{2^{2(n-m)}}\right] \\ \|F^{(m)}(i,j) - f^{(m,s)}(i,j)\|^2, & \text{otherwise} \end{cases}$$

and $\kappa, \rho \geq 0$. Finally, the automatic computing process of mappings described before determines f completely.

Note that $E_2^{(m,s)}{}_{(i,j)}$ becomes 0 if $f^{(m,s)}(i,j)$ is sufficiently close to $F^{(m)}(i,j)$ i.e., within $$\left[\frac{\rho^2}{2^{2(n-m)}}\right]. \tag{51}$$

It is defined so because it is desirable to determine each value $f^{(m,s)}(i,j)$ automatically to fit in an appropriate place in the destination image so long as it is close to $F^{(m)}(i,j)$. Because of this, it is unnecessary to specify the precise correspondence in detail; the source image is automatically mapped so that it matched the destination image.

[2] Concrete Processing Procedure

The flow of the process using the respective elemental techniques described in [1] will be described.

Figure 6:
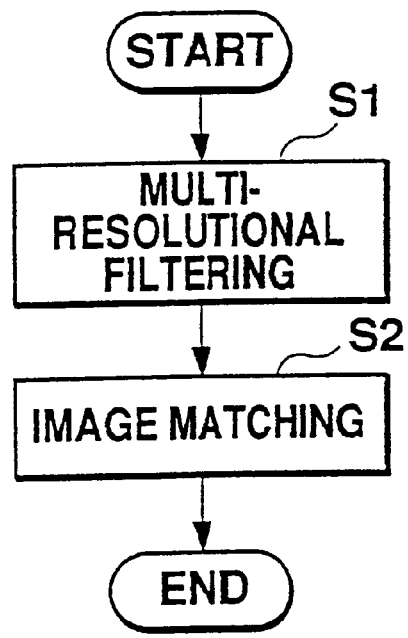
FIG. 6 is a flowchart of the entire procedure of a preferred embodiment.

FIG. 6 is the flowchart of the entire procedure of this embodiment. Referring to this drawing, processing using a multiresolutional critical point filter is first performed (S1). A source image and a destination image are then matched (S2). S2 is not always necessary for the present invention, and other processing, such as image recognition, may be performed instead, based on the characteristics of the image obtained at S1.

Figure 7:
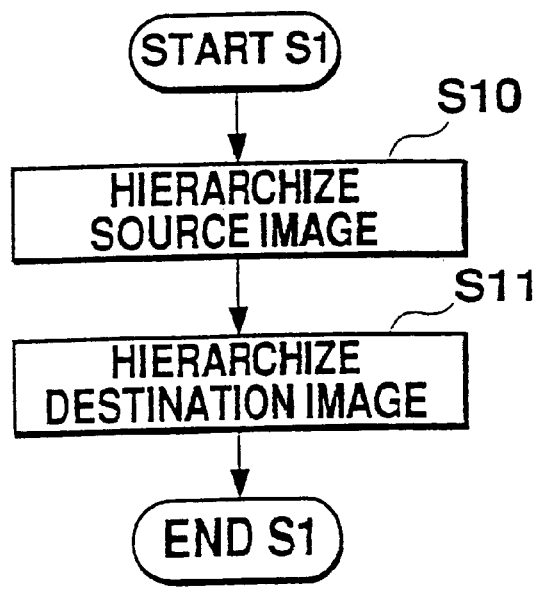
FIG. 7 is a flowchart showing the details of the process at S1 in FIG. 6.

FIG. 7 is a flowchart showing the details of the process at S1 in FIG. 6. This process is performed on the assumption that a source image and a destination image are matched at S2. To be specific, a source image is first hierarchized using a critical point filter (S10) to obtain a series of source hierarchical images. Then, a destination image is hierarchized in the same way (S11) to obtain a series of destination hierarchical images. The order of S10 and S11 in the flow is arbitrary, and they may be performed in parallel. FIG. 8 is a flowchart showing the details of the process at S10 in FIG. 7. The size of the original source image is defined $2^n \times 2^n$. Since source hierarchical images are sequentially generated from a fine resolution to a coarse resolution, the parameter m which indicates the level of resolution to be processed is set at n (S100). Then, critical points are detected from the images $p^{(m,0)}$, $p^{(m,1)}$, $p^{(m,2)}$, $p^{(m,3)}$, of the m-th level of resolution, using a critical point filter (S101) so that the images $p^{(m-1,0)}$, $p^{(m-1,1)}$, $p^{(m-1,2)}$, $p^{(m-1,3)}$ of the (m−1)th level are generated (S102). Since m=n here, $p^{(m,0)}=p^{(m,1)}=p^{(m,2)}=p^{(m,3)}=p^{(n)}$ holds, and four types of subimages are thus generated from a single source image.

Figure 9:
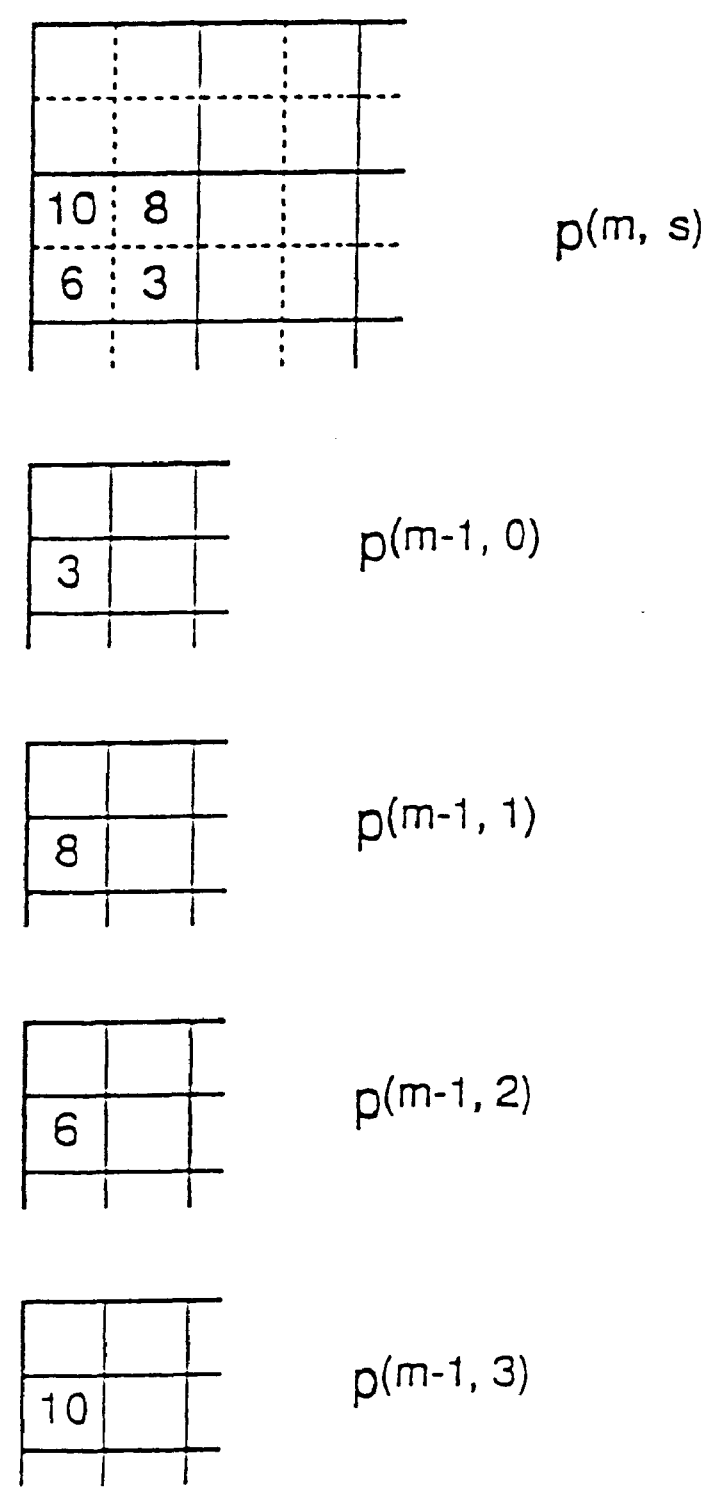

FIG. 9 shows correspondence between partial images of the m-th and (m−1)th levels of resolution. Respective values in the drawing represent the intensity of respective pixels. $p^{(m,s)}$ stands for any one of the four images $p^{(m,0)}$ to $p^{(m,3)}$, and is regarded as $p^{(m,0)}$ for the generation of $p^{(m-1,0)}$. From the block in FIG. 9, comprising four pixels with their pixel intensity values shown inside, images $p^{(m-1,0)}$, $p^{(m-1,1)}$, $p^{(m-1,2)}$, and $p^{(m-1,3)}$ obtain 3," "8," "6," and "10", respectively, according to the rules described in [1.2]. This block at the m-th level is replaced at the (m−1)th level by respective single pixels obtained. Thus, the size of the subimages at the (m−1)th level is $1^{m-1} \times 2^{m-1}$.

After m is decremented (S103 in FIG. 8), it is ensured that m is not negative (S104). The process returns to S101, where subimages of the next level of resolution, i.e., a courser level by one, are generated. The above process is repeated until subimages at m=0, i.e., at the 0-th level, are generated to complete the process at S10. The size of the subimages at the 0-th level is 1×1.

Figure 10:
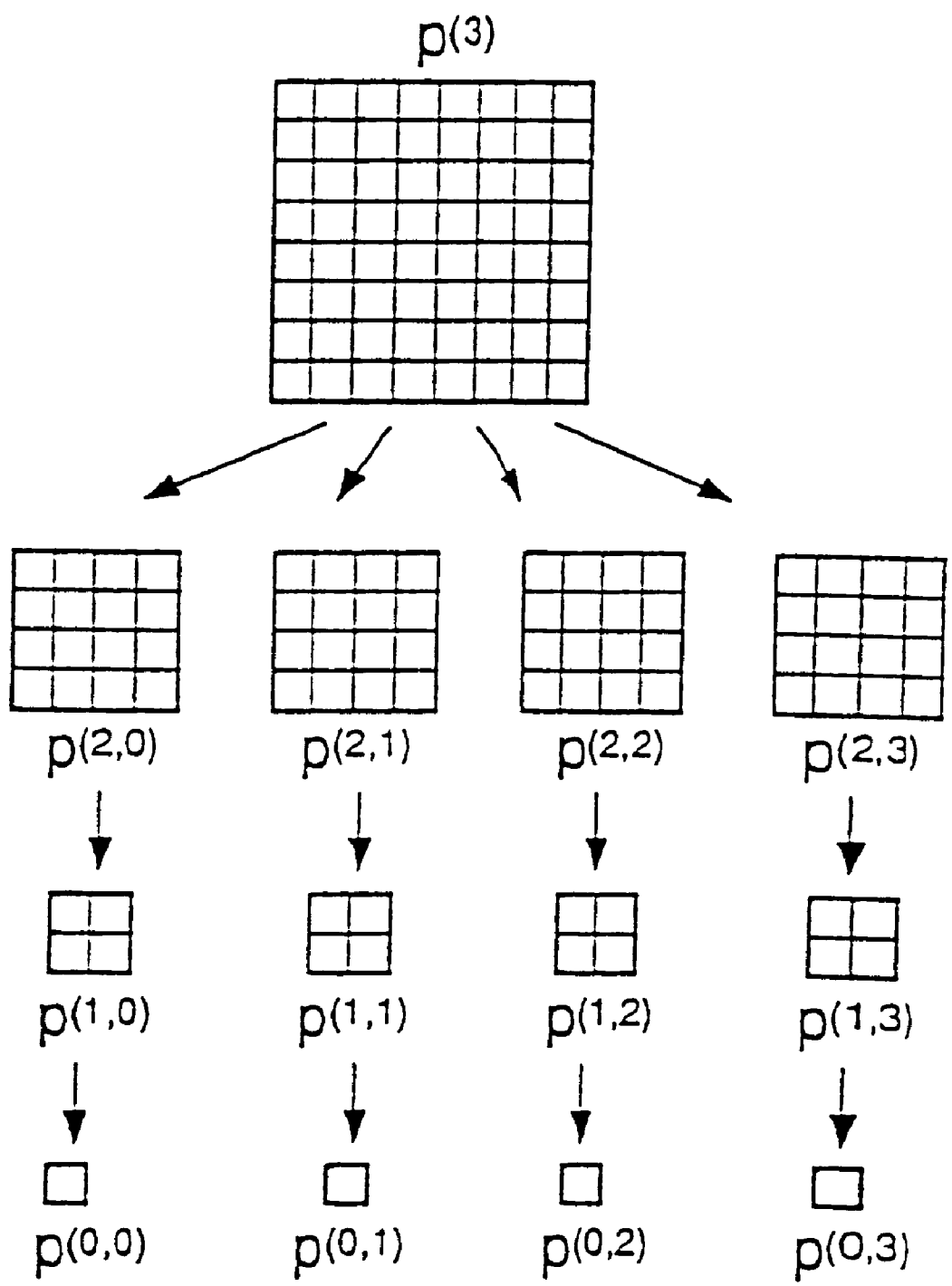
FIG. 10 is a diagram showing source hierarchical images generated in the embodiment.

FIG. 10 shows source hierarchical images for n=3 generated at S10. The initial source image is the sole image which is common to the four series. The following four types of subimages are generated independently, depending on the type of a critical point. Note that the process in FIG. 8 is common to S11 in FIG. 7, and that destination hierarchical images are generated through the same procedure. With the above, the process at S1 in FIG. 6 is completed.

Figure 11:
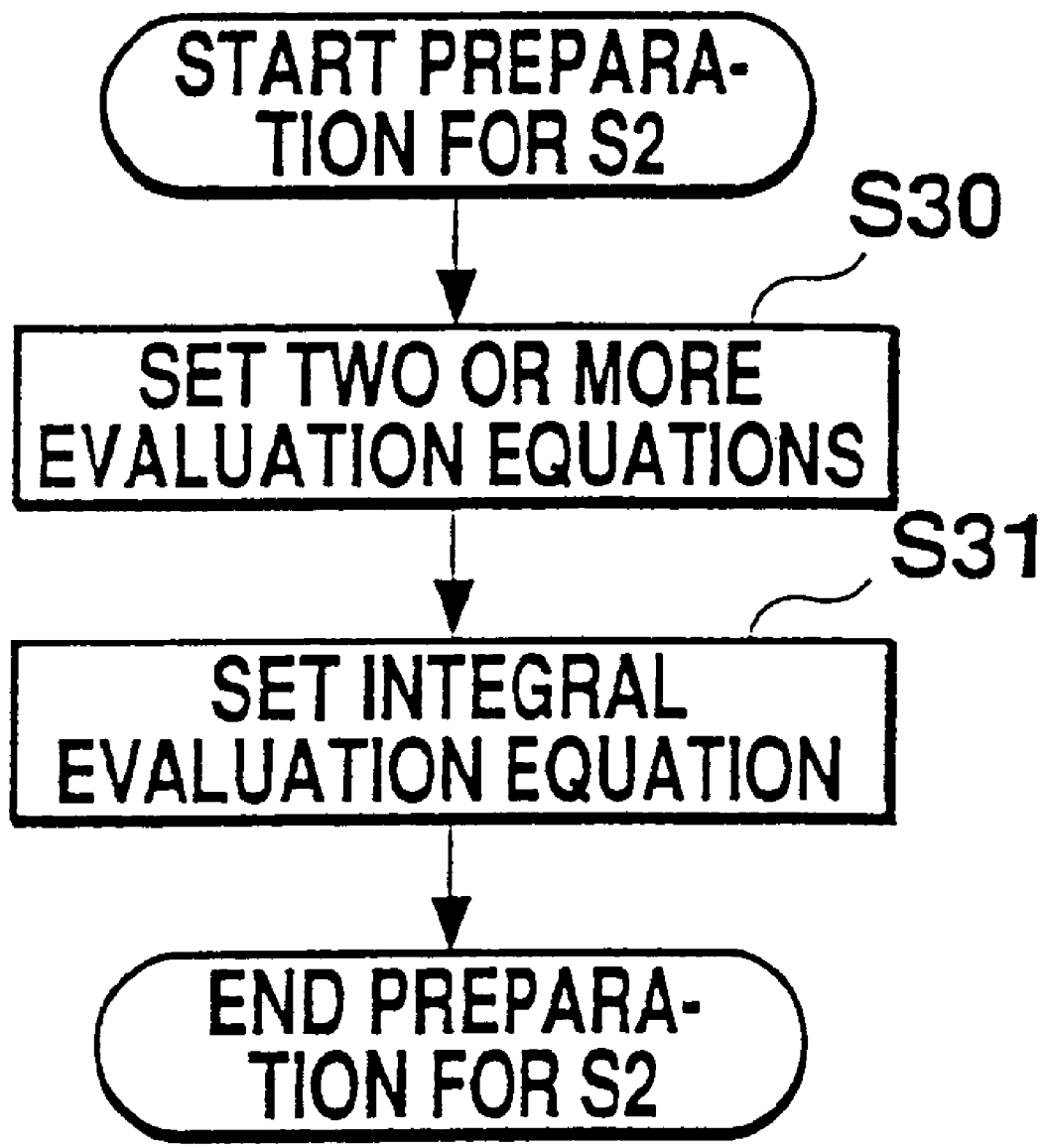
FIG. 11 is a flowchart of a preparation procedure for S2 in FIG. 6.

Upon completion of the process at S1, preparation for matching evaluation is made before proceeding to S2 in FIG. 6. FIG. 11 shows the preparation procedure. To be specific, a plurality of evaluation equations are determined (S30), namely the energy $C^{(m,s)}f$ relative to a pixel value, introduced in [1.3.2.1], and the energy $D^{(m,s)}f$ relative to the smoothness of the mapping introduced in [1.3.2.2]. By combining these equations, a combined evaluation equation is determined as $\lambda C^{(m,s)}f + D^{(m,s)}f$ (S31). Using $\lambda$ introduced in [1.3.2.2], a combined evaluation equation is denoted $$\Sigma\Sigma(\lambda C^{(m,s)}_{(i,j)} + \eta E_0^{(m,s)}_{(i,j)} + E_1^{(m,s)}_{(i,j)}) \quad (52)$$

The sum is computed respectively for i and j being 0, 1 . . . , $2^m-1$. With the above, preparation for matching evaluation is completed.

Figure 12:
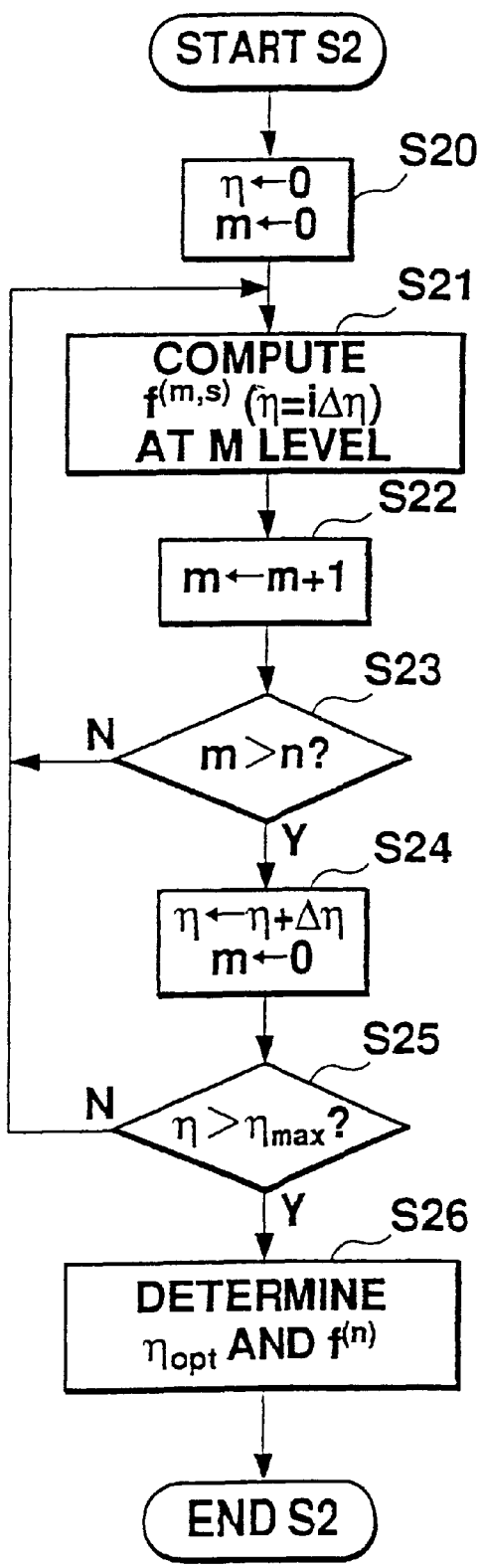
FIG. 12 is a flowchart showing the details of the process at S2 in FIG. 6.

FIG. 12 is a flowchart showing the details of the process at S2 in FIG. 6. As described in [1], source hierarchical images and destination hierarchical images are matched between images at the same level of resolution. For detecting global corresponding correctly, a matching is calculated at from a coarse level to a fine level of resolution. Since a critical point filter is used in generation of source and destination hierarchical images, the location and intensity of critical points are clearly preserved even at a coarse level. This makes it possible to seize global correspondence more accurately than by a conventional method.

Referring to FIG. 12, coefficient parameter $\eta$ and level parameter m are set at 0 (S20). A matching is computed between respective four subimages at the m-th level of the source hierarchical images and of the destination hierarchical images so that four types of submappings $f^{(m,s)}$ (s=0, 1, 2, 3) which satisfy the BC and minimize the energy are obtained (S21). The BC is checked using an inherited quadrilateral described in [1.3.3]. The submappings at the m-th level are constrained by those at the (m−1)th level, as indicated by equations 17 and 18. The matching calculated at a coarser level of resolution is thus sequentially used in subsequent calculation of a matching. This may be called vertical reference between different levels. When m=0, there is no courser level and the process therein should be different from the process, which will be described later referring to FIG. 13.

Horizontal reference is also performed at the same level. As indicated by equation 20 in [1.3.3], $f^{(m,3)}$, $f^{(m,2)}$, and $f^{(m,1)}$ are respectively defined so as to be analogous to $f^{(m,2)}$, $f^{(m,1)}$, and $f^{(m,0)}$ because it is unnatural that submappings relative to different types of critical points are completely different from one another so long as they are originally included in the same source or destination images. As is known from equation 20, when submappings are closer to each other, the energy becomes smaller and the matching is considered as more preferable.

As for $f^{(m,0)}$, which is to be initially determined, a coarser level by one is referred to since there is no other submapping at the same level available for reference. In the implementation, however, $f^{(m,0)}$ is determined after the submappings were obtained up to $f^{(m,3)}$, by updating $f^{(m,0)}$ initially determined using the submapping $f^{(m,3)}$ as a constraint. This process is equivalent to the process in which s=4 is substituted into equation 20 to make $f^{(m,4)}$ final $f^{(m,0)}$. The above process is employed to avoid the tendency that the relevance between $f^{(m,0)}$ and $f^{(m,3)}$ becomes too low. This scheme actually produced a preferable result. In addition to the above, the submappings are shuffled in the implementation as described in [1.7.1] so as to maintain close relevance among submappings which are originally determined independently for every type of critical point. Further, in order to prevent the processing from being biased due to repeated use of the same starting point, the location thereof is changed according to the value of s, as described in [1.7].

Figure 13:
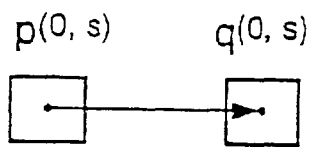
FIG. 13 is a diagram showing the way a submapping is determined at the 0-th level.
Figure 14:
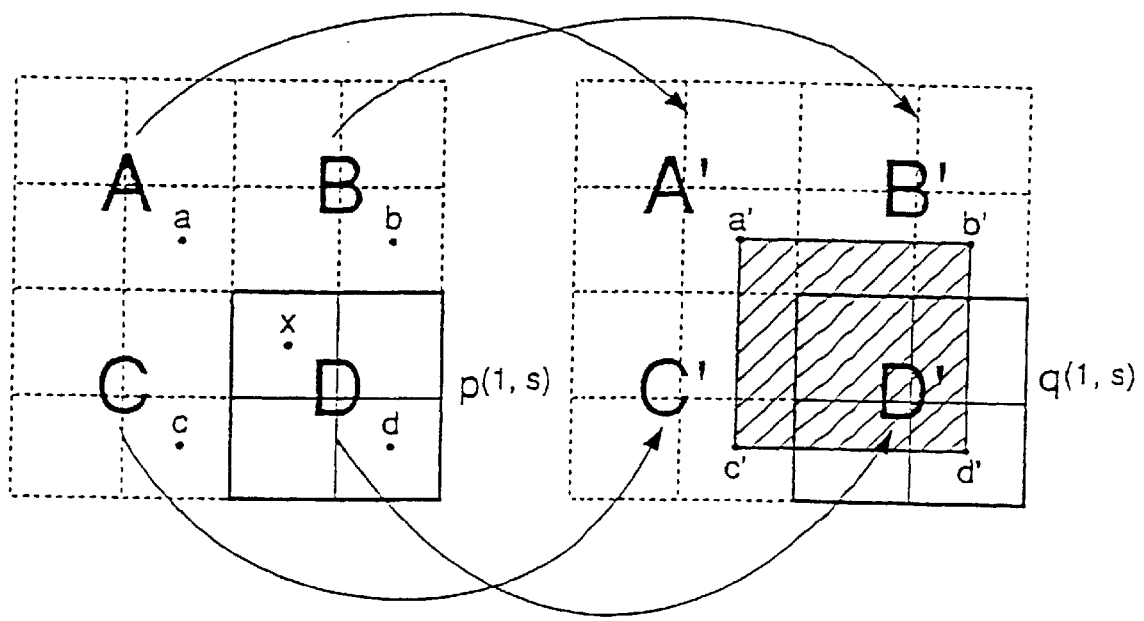
FIG. 14 is a diagram showing the way a submapping is determined at the first level.

FIG. 13 shows the way how the submapping is determined at the 0-th level. At the 0-th level, an identity mapping is automatically selected for each of the four submappings $f^{(m,s)}$ since each of $f^{(m,s)}$ is constituted of a single pixel. FIG. 14 shows the way how the submappings are determined at the first level. At the first level, each of the submappings is constituted of four pixels, which are indicated by a solid line in the drawing. A corresponding point (pixel) of the point (pixel) x in $p^{(l,s)}$ is searched within $q^{(l,s)}$ according to the following procedure.

1. An upper left point a, an upper right point b, a lower left point, a lower right point d of the point x are searched at the first level of resolution.
2. Pixels to which the points a to d belong at a coarser level by one, i.e., the 0-th level, are searched. In FIG. 14, the points a to d belong to the pixels A to D, respectively. The points A to C are hypothetical pixels which only exist virtually.
3. The corresponding points A' to D' of the pixels A to D, which have already been defined at the 0-th level, are plotted in $q^{(l,s)}$. The pixels A' to C' are also hypothetical pixels and assumed to be located at the same positions as the pixels A to C.
4. Presuming that the corresponding point a' of the point a in the pixel A is located inside the pixel A', the point a' is accordingly plotted under the assumption that the point a occupies the same location in the pixel A as that of the point a in the pixel A (lower right here).
5. The corresponding points b' to d' are plotted using the same method as the above so as to constitute an inherited quadrilateral using the points a' to d'.
6. The corresponding point x' of the point x is searched such that the energy becomes minimized in the inherited quadrilateral. Candidate corresponding points x' may be limited to the pixels, for instance, whose centers are included in the inherited quadrilateral. In FIG. 14, four pixels all become candidates.

The above described is a procedure for determining the corresponding point of a given point x. The same processing is performed to all the other points for determination of the submappings. As a deformed inherited quadrilateral is expected at the second and upper levels, the pixels A' to D' are located, getting apart from one another as shown in FIG. 3.

Once four submappings at the m-th level are determined as described above, m is incremented (S22 in FIG. 12). It is then ensured that m does not exceed n (S23) before the process returns to S21. Hereinafter, every time the process returns to S21, submappings at a finer level of resolution are obtained until the process finally returns to S21 where the mapping $f^{(n)}$ at the n-th level is determined. The above mapping is denoted as $f^{(n)}$ ($\eta=0$), as it has been determined relative to $\eta=0$.

Next, to obtain the mapping for the next $\eta$, $\eta$ is shifted by $\Delta\eta$ and m is reset to zero (S24). After ensuring that new $\eta$ does not exceed a predetermined threshold $\eta_{max}$ (S25), the process returns to S21, where the mapping $f(\eta)$ ($\eta=\Delta\eta$) for the new $\eta$ is obtained. This process is repeated to obtain $f^{(n)}$ ($\eta=i\ \Delta\eta$) ($i=0,1,...$) at S21. When $\eta$ exceeds $\eta_{max}$, the process proceeds to S26, where the optimal $\eta=\eta_{opt}$ is determined using a method described later, and $f^{(n)}$ ($\eta=\eta_{opt}$) becomes the final mapping $f^{(n)}$.

Figure 15:
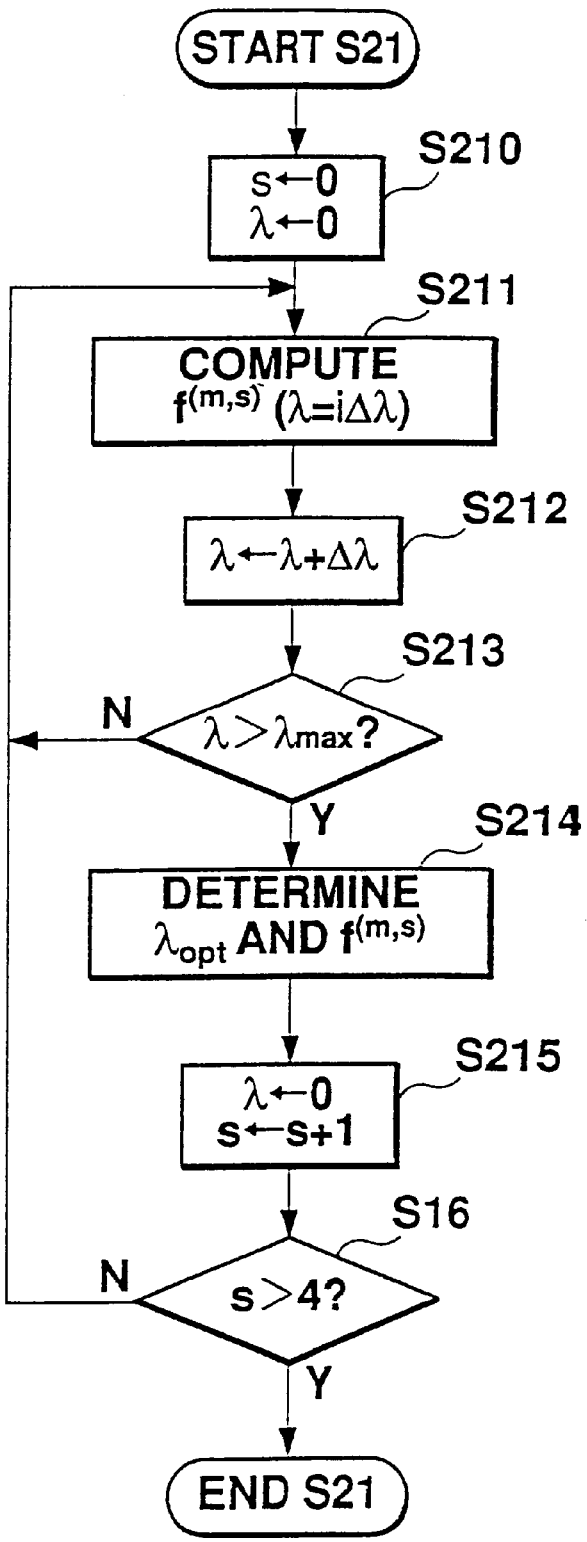
FIG. 15 is a flowchart showing the details of the process at S21 in FIG. 12.

FIG. 15 is a flowchart showing the details of the process at S21 in FIG. 12. According to this flowchart, the submappings at the m-th level are determined for a certain $\eta$. In determination of the mappings, the optimal $\lambda$ is defined independently for every submapping in this embodiment.

Referring to FIG. 15, s and $\lambda$ are reset to zero (S210). Then, the submapping $f^{(m,s)}$ that minimizes the energy is obtained for then $\lambda$ (and implicitly for then $\eta$) (S211), and denoted as $f^{(m,s)}$ ($\lambda=0$). To obtain a mapping for the next $\lambda$, $\lambda$ is shifted by $\Delta\lambda$(S212), and it is ensured that it does not exceed a predetermined threshold $\lambda_{max}$ (S213). The process then returns to S211, where $f^{(m,s)}$ ($\lambda=i\Delta\lambda$) ($i=0,1,...$) is obtained. When $\lambda$ exceeds $\alpha_{max}$, the process proceeds to S214 to determine the optimal $\lambda=\lambda_{opt}$, and $f^{(m,0)}$ ($\lambda=\lambda_{opt}$) becomes the final mapping $f^{(m,0)}$ (S214).

Subsequently, $\lambda$ is reset to zero and s is incremented to obtain the next submapping at the same level (S215). After ensuring that s does not exceed 4 (S216), the process returns to S211. When s=4, $f^{(m,0)}$ is updated reflecting $f^{(m,3)}$ as described above to complete determination of submappings at that level.

Figure 16:
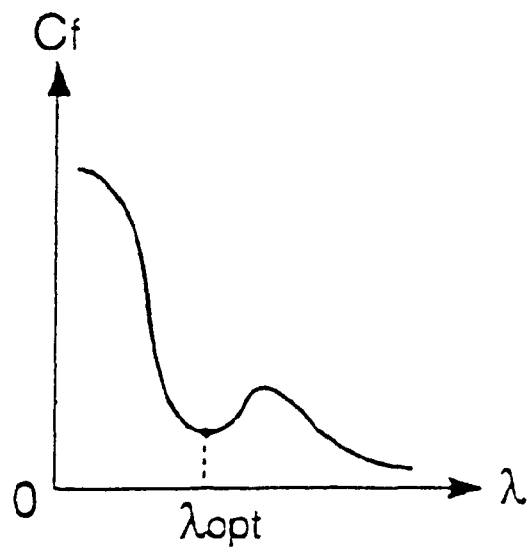
FIG. 16 is a diagram showing the behavior of energy $C^{(m,s)}f$ corresponding to $f^{(m,s)}$ ($\lambda=i\Delta\lambda$) which has been obtained for a certain $f^{(m,s)}$ while changing $\lambda$.

FIG. 16 shows the behavior of the energy $C^{(m,s)}_f$ corresponding to $f^{(m,s)}$ ($\lambda=i\ \Delta\lambda$) which has been obtained as to certain m and s while changing $\lambda$. As described in [1.4], as $\lambda$ increases, $C^{(m,s)}_f$ normally decreases and turns to increase when $\lambda$ exceeds the optimal value. In this embodiment, $\lambda$ with minimum $C^{(m,s)}_f$ is determined as $\lambda$opt. Even if $C^{(m,s)}_f$ becomes smaller again in the range $\lambda>\lambda$opt, the mapping has already been spoiled by then. For this reason, the first minimum should be noticed. $\lambda$opt is independently determined for every submapping including for $f^{(n)}$.

Figure 17:
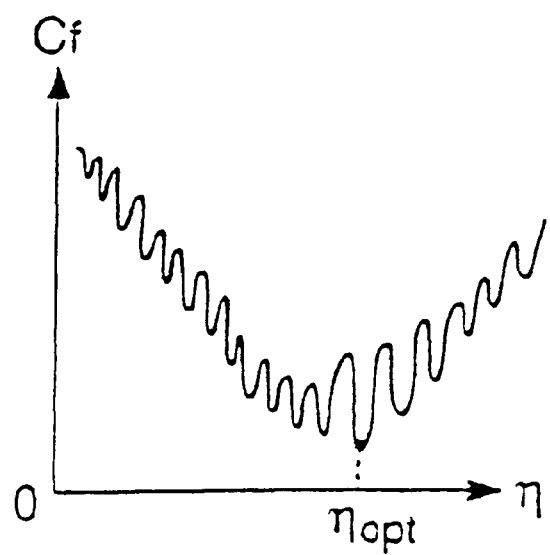
FIG. 17 is a diagram showing the behavior of energy $C^{(n)}f$ corresponding to $f^{(n)}(\eta=i\Delta\eta)$ (i=0, 1, . . . ) which has been obtained while changing $\eta$.

FIG. 17 shows the behavior of the energy $C^{(n)}_f$ corresponding to $f^{(n)}(\eta=i\ \Delta\eta)$ which has been obtained while changing $\eta$. Here again, since $C^{(n)}_f$ normally decreases as $\eta$ increases and turns to increase when it exceeds the optimal value, $\eta$ with minimum $C^{(n)}_f$ is determined as $\eta_{opt}$. FIG. 17 can be taken as an enlarged diagram around zero along the horizontal axis in FIG. 4. Once $\eta$opt is decided, $f^{(n)}$ can be finally determined.

As described above, this embodiment can provide various merits. First, since edge detection is unnecessary, problems occurring in connection with the conventional technique of edge detection type can be solved. Further, prior knowledge about objects included in an image is unnecessary, and automatic detection of corresponding points is achieved. Using a critical point filter, it is possible to preserve intensity and locations of critical points even at a coarse level of resolution. This has strong application to object recognition, characteristic extraction, and image matching. As a result, it is possible to construct an image processing system which significantly reduces manual labors.

Some extensions or modifications of the above embodiment may be made as follows:

i) Parameters are automatically determined while matching source and destination hierarchical images in the above embodiment. This method can be applied not only to matching hierarchical images but also to matching two images.

For instance, energy $E_0$ relative to a difference in the intensity of pixels and energy $E_1$ relative to a positional displacement of pixels between two images may be used as evaluation equations, and a linear sum of these equations, i.e., $E_{tot}=E_0+E_1$, may be used as a combined evaluation equation. While noting or paying attention to the neighborhood of the extreme of this combined evaluation equation, $\alpha$ is automatically determined. That is, mappings which minimize $E_{tot}$ are obtained for various $\alpha$. $\alpha$ with minimum $E_1$ concerning $\alpha$ is determined as an optimal parameter $\alpha_{opt}$, and the mapping corresponding to $\alpha_{opt}$ among various mappings obtained above is finally determined as the optimal mapping between those images.

Many other methods are available for determination of evaluation equations. For instance, an equation which becomes larger for a better estimation, such as $1/E_1$ and $1/E_2$, may be employed. A combined evaluation equation is not necessarily a linear sum, and an n-fold sum (n=2, ½, −1, −2, etc.), a polynomial, an arbitrary function may be employed as desired.

The system may employ a single parameter such as the above $\alpha$, two parameters such as $\eta$ and $\lambda$ or more parameters. When multiple parameters are used, they are determined while changing one by one.

ii) In the described embodiment, a parameter is determined in the process in which the mapping is first determined such that the value of a combined evaluation equation is minimized, and the point at which one of the evaluation equations constituting the combined evaluation equation, namely, $C^{(m,s)}_f$, is minimized is then detected.

However, instead of this two-step processing, a parameter may be effectively determined in some cases simply such that the minimum of a combined evaluation equation becomes the smallest. In such a case, $\alpha E_0+\beta E_1$, for instance, may be employed as a combined evaluation equation, and $\alpha+\beta=1$ is imposed as a constraint for equal treatment of respective evaluation equations. The essence of automatic determination of a parameter lies in so determining the parameter that it minimizes the energy.

iii) In the above embodiment, four types of submappings are generated for four types of critical points at respective levels of resolution. However, one, two, or three types out of the four may be selectively used. For instance, if only one bright point exists in an image, generation of hierarchical images based solely on $f^{(m,3)}$, which is relative to a maximum, can produce sufficient effect. In this case, no other submapping is necessary at the same level, and the amount of computation relative to s is effectively reduced.

iv) In the above embodiment, as the level of resolution of an image is advanced by one through a critical point filter, the number of pixels becomes ¼. However, assuming that one block is consisted of 3×3 pixels, and critical points are searched in this 3×3 block, the number of pixels is reduced to ⅑ as the level advances by one.

v) When the source and the destination images are color images, they are first converted to monochrome images, and the mappings are then computed. The original color images are then transformed by the resulting mappings. Other methods may include the computation of submapping for respective RGB component.

[4] Experimental Results

Using the described embodiment, various images can be interpolated. When two images from different viewpoints are interpolated, images from intermediate viewpoints can be generated. This has strong applications for World Wide Web (WWW) based information servers because it enables generating arbitrary views from a limited number of images. When images of two persons faces are interpolated, it is possible to perform morphing. When the images are cross-sections of 3D objects such as CT and MRI data, the interpolation enables to reconstruct accurate 3D object shapes for volume rendering.

Figure 18A:
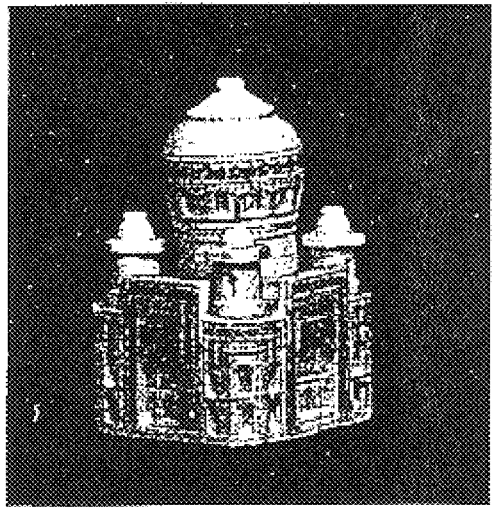
FIG. 18(a) shows a left-eye image of an object.
Figure 18B:
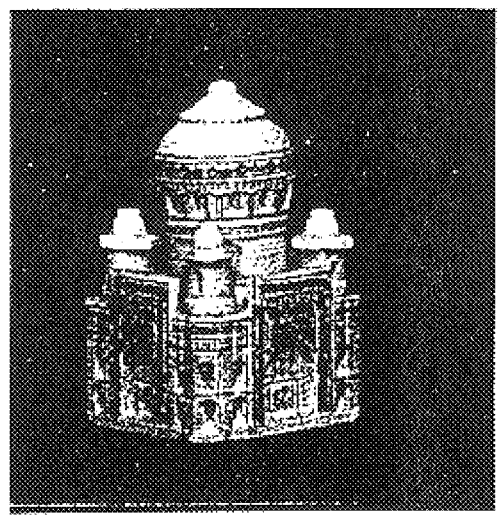
FIG. 18(b) shows a right-eye image of an object.
Figure 18C:
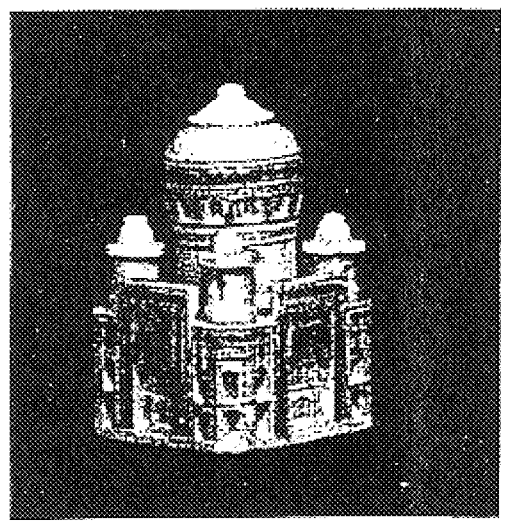
FIG. 18(c) shows an interpolation image of an object, generated in the preferred embodiment.

FIGS. 18(a), 18(b), and 18(c) relate to a case where the mapping is used for generating intermediate view point images. A left-eye image and a right-eye image are interpolated here. FIG. 18(a) shows the source image viewed with a left eye; FIG. 18(b) shows that with a right eye; and FIG. 18(c) shows the resulting intermediate image wherein the value of the parameter t described in [1.8] is 0.5 for simplicity.

Figure 19A:
FIG. 19(a) shows an image of one human face.
Figure 19B:
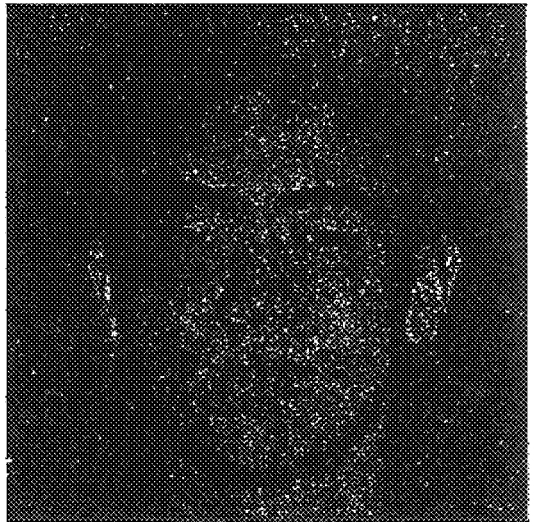
FIG. 19(b) shows an image of another human face.
Figure 19C:
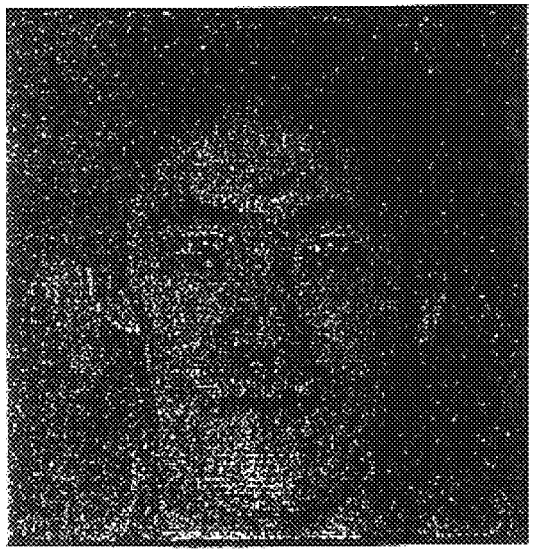
FIG. 19(c) shows an image of the human faces shown in FIGS. 19(a) and 19(b) superimposed on each other.
Figure 19D:
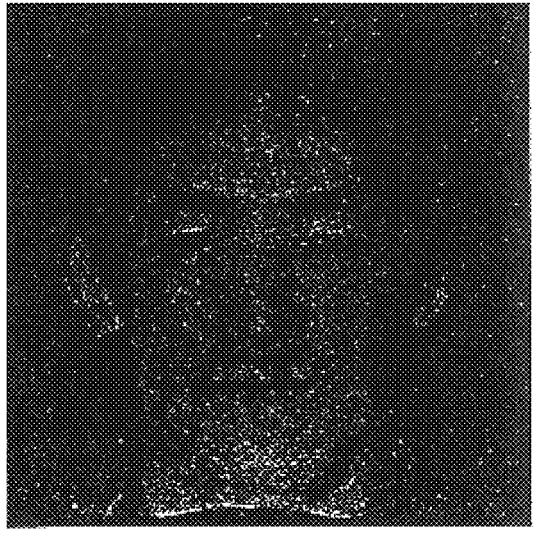
FIG. 19(d) shows a morphing image generated in the preferred embodiment.

FIGS. 19(a), 19(b), and 19(c) relate to a case where the mapping is used for morphing of human faces. Two facial images of different persons are interpolated. FIG. 19(a) shows the source image; FIG. 19(b) shows the destination image; FIG. 19(c) shows the source image superimposed by the destination image; and FIG. 19(d) shows the resulting intermediate image wherein t=0.5.

Figure 20A:
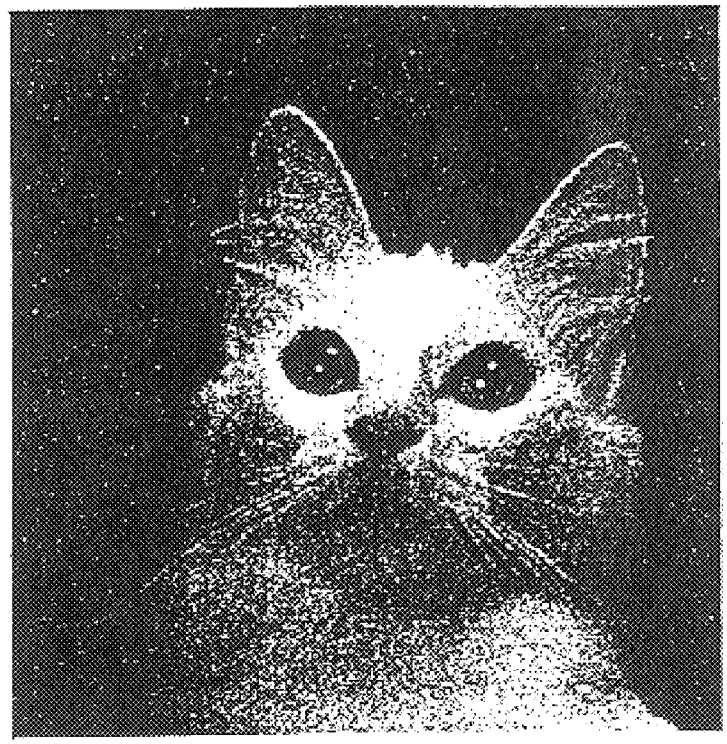
FIG. 20(a) shows the face of a cat.
Figure 20B:
FIG. 20(b) shows a morphing image of the face of a cat and a human face.

FIGS. 20(a), 20(b), and 20(c) relate to a case where the mapping is used for interpolation of a human face and a face of a cat. FIG. 20(a) shows a face of a cat; FIG. 20(b) shows a morphing image of a human face and a face of a cat. FIG. 19(a) is used for the human face. The normalization of the pixel intensity described in [1.6] is used only in this example.

Figure 21A:
FIG. 21(a) shows a left-eye image including many objects.
Figure 21B:
FIG. 21(b) shows a right-eye image including many objects.
Figure 21C:
FIG. 21(c) shows an interpolation image including many objects, generated in the preferred embodiment.

FIGS. 21(a), 21(b), and 21(c) relate to a case where the system is applied to images including a number of objects. FIG. 21(a) shows the source image; FIG. 21(b) shows the destination image; and FIG. 21(c) is the resulting intermediate image wherein t=0.5.

Figure 22A:
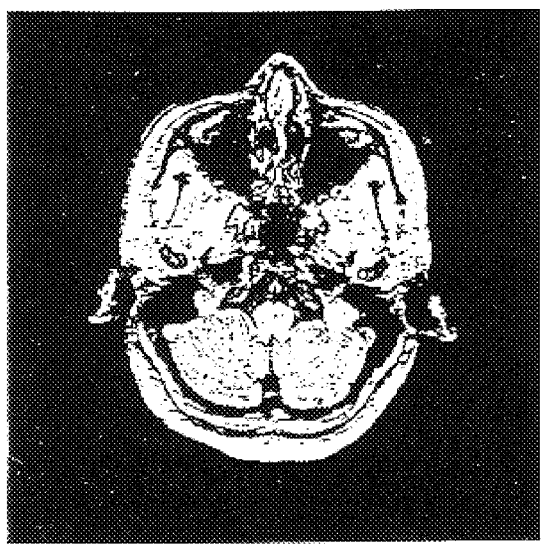
FIG. 22(a) shows an MRI source image.
Figure 22B:
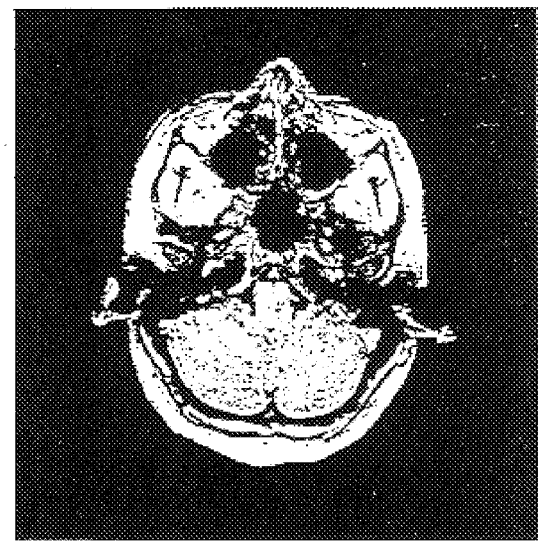
FIG. 22(b) shows an MRI destination image.
Figure 22C:
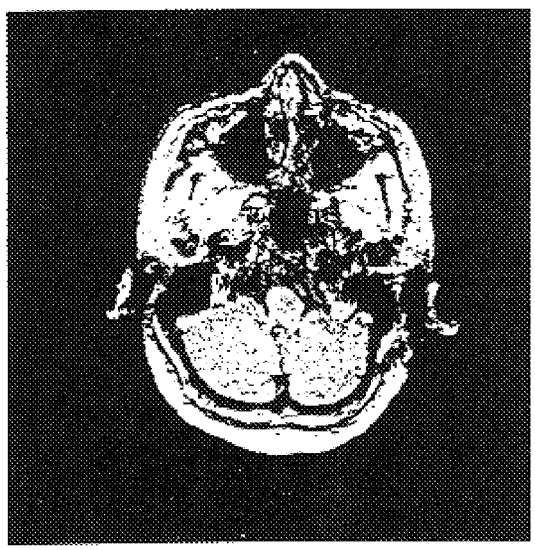
FIG. 22(c) shows an interpolation image generated in the preferred embodiment.
Figure 22D:
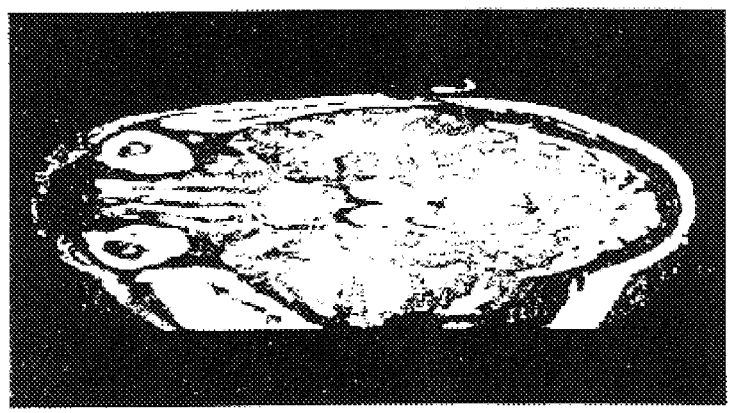
FIG. 22(d) shows a volume rendering image generated based on an interpolation image.

FIGS. 22(a), 22(b), 22(c), and 22(d) show the result where the mapping is used for interpolating images of a human brain whose cross sections are obtained by MRI. FIG. 22(a) shows the source image; FIG. 22(b) shows the destination image (the upper cross section); FIG. 22(c) shows the intermediate image wherein t=0.5; and FIG. 22(d) shows the oblique view of the result of the volume rendering with four cross sections. The object is completely opaque and the interpolated pixels whose intensity is larger than 51(=255×0.2) are displayed. The reconstructed object is then cut vertically near the center to show the interior of the volume.

In these examples, an MRI image is of 512×512 pixels, and other images are of 256×256 pixels. The intensity of a pixel varies from 0 to 255. The SJ condition described in [1.3.1] is used in all the application examples except for FIGS. 21(a) to 21(c). In all the application examples, $B_{Others}=0.003$ and $B_{1thres}=0.5$ are used, and it has not been necessary to modify their values for any image. The pixel intensity of each subimages has been normalized in FIGS. 20(a) and 20(b) only.

The writing of this specification necessitated choosing or creating a number of terms and it should be noted that these choices were made in order to describe the current invention, and not to limit it from the full scope and spirit as claimed.

What is claimed is:

1. An image matching method for matching a first image and a second image, said method comprising:
   determining first critical points in said first image, said first critical points including at least three types of critical points;
   determining second critical points in said second image, said second critical points including said at least three types of critical points;
   detecting correspondence between said first image and said second image by matching said first critical points and said second critical points.

2. The image matching method of claim 1, wherein said matching said first critical points and said second critical points comprises forming a mapping for each critical point type of said at least three types of critical points between said first critical points and said second critical points.

3. The image matching method of claim 2, wherein said mapping for each critical point type is made in consideration of at least one other of said mappings for each critical point type.

4. The image matching method of claim 1, wherein said at least three types of critical points comprise a maximum, a minimum, and two types of saddlepoints.

5. The image matching method of claim 1, wherein said first critical points and said second critical points comprise local critical points determined in predetermined areas of said first image and said second image respectively.

6. The image matching method of claim 1, wherein said first critical points and said second critical points are determined based on pixel value.

7. The image matching method of claim 6, wherein said pixel value comprises a combination of a plurality of pixel attributes.

8. The image matching method of claim 6, wherein said pixel value comprises pixel intensity.

9. An image matching method comprising:
   extracting a first set of critical points from a first image by conducting a two-dimensional search over said first image, said first set of critical points including at least three types of critical points;
   extracting a second set of critical points from a second image by conducting a two-dimensional search over said second image, said second set of critical points including said at least three types of critical points;
   detecting correspondence between said first image and said second image by matching said at least three types of critical points respectively between said first image and said second image.

10. The image matching method of claim 9, wherein said matching said at least three types of critical points respectively comprises forming a mapping for each critical point type of said at least three types of critical points between said first set of critical points and said second set of critical points.

11. The image matching method of claim 10, wherein said mapping for each critical point type is made in consideration of at least one other of said mappings for each critical point type.

12. The image matching method of claim 9, wherein said at least three types of critical points comprise a maximum, a minimum, and a saddlepoint.

13. The image matching method of claim 9, wherein said first set of critical points and said second set of critical points comprise local critical points determined in predetermined areas of said first image and said second image respectively.

14. The image matching method of claim 9, wherein said first set of critical points and said second set of critical points are determined based on pixel value.

15. The image matching method of claim 14, wherein said pixel value comprises a combination of a plurality of pixel attributes.

16. The image matching method of claim 14, wherein said pixel value comprises pixel intensity.

17. An image matching method for matching a first image and a second image, said method comprising:

for said first image, generating, through multiresolutional critical point filtering, first hierarchical images each having a different resolution;

for said second image, generating, through multiresolutional critical point filtering, second hierarchical images each having a different resolution;

matching said first hierarchical images and said second hierarchical images.

* * * * *